US009852448B2

(12) United States Patent
Margulis et al.

(10) Patent No.: US 9,852,448 B2
(45) Date of Patent: Dec. 26, 2017

(54) IDENTIFYING GAPS IN SEARCH RESULTS

(71) Applicant: Samsung Electronics Co., Ltd., Suwon-si, Gyeonggi-do (KR)

(72) Inventors: Leandro Margulis, San Francisco, CA (US); Eric J. Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 14/490,276

(22) Filed: Sep. 18, 2014

(65) Prior Publication Data

US 2015/0081660 A1    Mar. 19, 2015

Related U.S. Application Data

(60) Provisional application No. 61/880,055, filed on Sep. 19, 2013.

(51) Int. Cl.
*G06F 17/30* (2006.01)
*G06Q 30/02* (2012.01)

(52) U.S. Cl.
CPC ................. *G06Q 30/0263* (2013.01)

(58) Field of Classification Search
CPC ................................. G06F 17/30864
USPC .......................................... 707/706
See application file for complete search history.

(56) References Cited

U.S. PATENT DOCUMENTS

| 8,510,287 B1* | 8/2013 | Wu .......................... G06F 7/00 707/706 |
| 8,566,173 B2 | 10/2013 | Mahaniok et al. |
| 8,938,438 B2* | 1/2015 | Nijjer ..................... H04L 63/08 707/706 |
| 2009/0037355 A1 | 2/2009 | Brave et al. |
| 2009/0150388 A1* | 6/2009 | Roseman ............. G06F 17/278 |
| 2011/0131237 A1* | 6/2011 | Macaluso ................ G06F 8/63 707/769 |
| 2012/0072283 A1* | 3/2012 | DeVore ............. G06Q 30/0251 705/14.49 |
| 2012/0109966 A1* | 5/2012 | Liang ................ G06F 17/30643 707/740 |

(Continued)

OTHER PUBLICATIONS

International Search Report and Written Opinion for WO Application No. PCT/US2014/056357 dated Dec. 31, 2014.

*Primary Examiner* — Jean M Corrielus
(74) *Attorney, Agent, or Firm* — Harness, Dickey & Pierce, P.L.C.

(57) ABSTRACT

A method for determining whether to recommend a target application includes receiving a system identifier indicating a target system. The target system can be a digital distribution platform or an operating system. The method further includes identifying a target application that is unavailable on/for the target system and determining a recommendation score of the target application based on query analytics data corresponding to search queries received by a search engine that identifies applications to indicate in search results in response to received search queries. The method also includes selecting whether to recommend the target application based on the recommendation score, and when the target application is selected for recommendation, recommending the target application to an organization affiliated with the target system based on the recommendation score.

12 Claims, 13 Drawing Sheets

(56) References Cited

U.S. PATENT DOCUMENTS

| | | | |
|---|---|---|---|
| 2012/0316955 A1* | 12/2012 | Panguluri | G06Q 30/02 705/14.41 |
| 2013/0046651 A1 | 2/2013 | Edson | |
| 2013/0185292 A1* | 7/2013 | Li | G06F 17/30522 707/723 |
| 2013/0268513 A1* | 10/2013 | Wu | G06F 7/00 707/722 |
| 2014/0214850 A1* | 7/2014 | Liang | G06F 17/30873 707/740 |
| 2014/0229467 A1* | 8/2014 | Roseman | G06F 17/278 707/723 |
| 2014/0337372 A1* | 11/2014 | Lee | G06F 8/30 707/767 |
| 2015/0088850 A1* | 3/2015 | Nijjer | H04L 63/08 707/706 |
| 2017/0039272 A1* | 2/2017 | Roseman | G06F 17/278 |

* cited by examiner

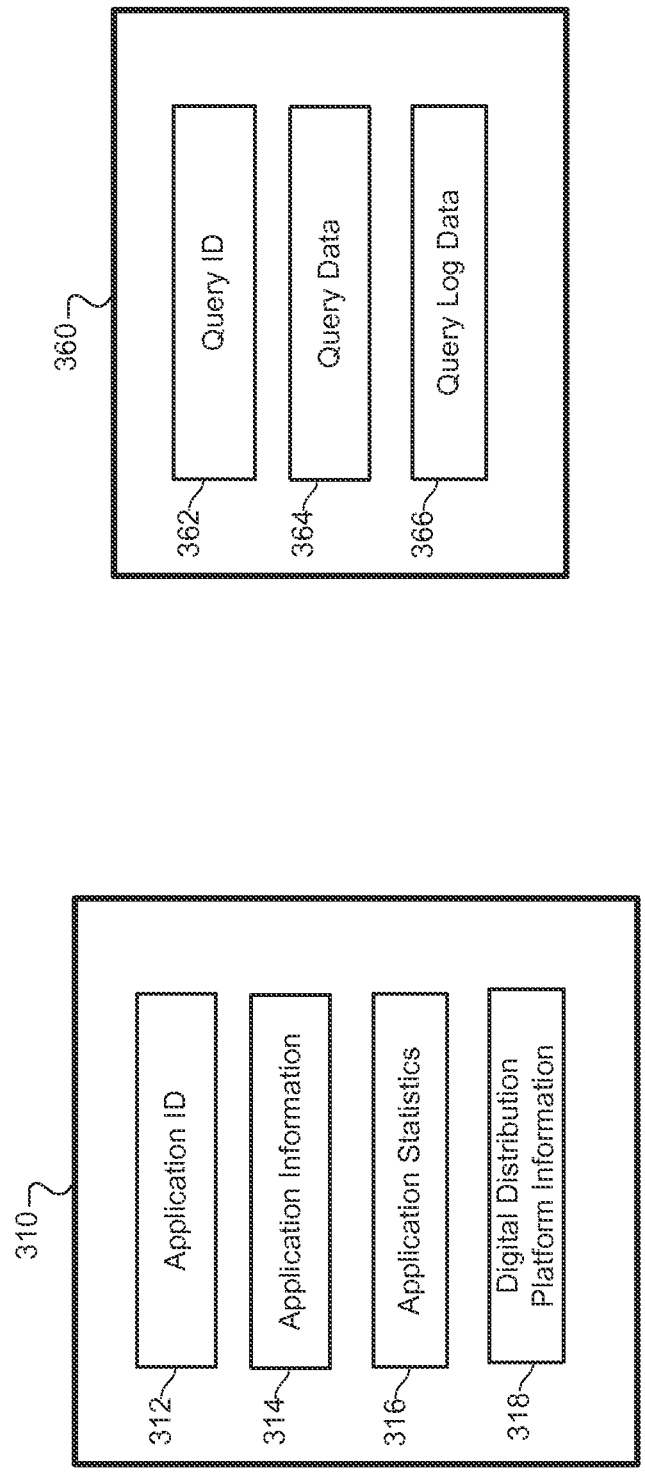

IDENTIFYING GAPS IN SEARCH RESULTS

PRIORITY CLAIM

This U.S. patent application claims priority under 35 U.S.C. §119(e) to U.S. Provisional Application 61/880,055, filed on Sep. 19, 2013, the contents of which are hereby incorporated by reference in its entirety.

TECHNICAL FIELD

This disclosure relates to identifying potential gaps in application search results.

BACKGROUND

Users of user devices can customize their devices by downloading applications to their respective devices. Applications provide various functionalities to users. For example, a user can download applications to his or her user device that allow him or her to check the weather, purchase movie tickets, find a date, read books, watch movies, listen to music, and make restaurant reservations. A user device executes an operating system out of many possible operating system (e.g., the IOS operating system by Apple Inc., the ANDROID operating system maintained by Google Inc., and the AMAZON FIRE operating system by Amazon Inc.). Furthermore, user devices may be configured to access a limited number of digital distribution platforms out of many possible digital distribution platforms (e.g., GOOGLE PLAY digital distribution platform by Google, Inc. and the APP STORE digital distribution platform by Apple, Inc.). In order for an application to be executable on a particular user device, the application must include an edition that is configured for the operating system and may need to be available on a digital distribution platform that the user device can access.

Application developers develop applications for specific operating systems and/or make the applications available on a limited number of digital distribution platforms. For example, some developers only develop applications for the IOS operating system, while others develop applications for the ANDROID operating system. Similarly, some applications may only be available on certain digital distribution platforms. In this way, users of user devices are limited in the applications that they can download to their respective user devices based on the operating system that the user device executes and the digital distribution platform(s) that their device can access. The unavailability of one or more key applications for a particular operating system or on a particular digital distribution platform may cause a user to switch user devices or may discourage a user from purchasing a particular user device.

SUMMARY

The present disclosure relates to a recommendation engine and methods for identifying gaps in search results. According to some implementations of the present disclosure, a method for determining whether to recommend a target application is disclosed. The method includes receiving, by a processing device, a system identifier indicating a target system. The target system can be a digital distribution platform or an operating system. The method further includes identifying, by the processing device, a target application that is unavailable on/for the target system and determining, by the processing device, a recommendation score of the target application based on query analytics data corresponding to search queries received by a search engine that identifies applications to indicate in search results in response to received search queries. The method also includes selecting, by the processing device, whether to recommend the target application based on the recommendation score, and when the target application is selected for recommendation, recommending the target application to an organization affiliated with the target system based on the recommendation score.

Implementations of the disclosure may include one or more of the following optional features. According to some implementations of the present disclosure determining the recommendation score includes determining a first number of total search queries received by the search engine, determining a second number of total search queries received by the search engine that implicated the application in the respective search results, and determining the recommendation score based on the first number of total search queries and the second number of total searches. In some implementations, determining the second number of total search queries includes retrieving one or more query records from a query record datastore using an application identifier of the target application and, for each of the one or more query records, determining a number of sets of search results that indicate the target application. The query datastore stores a plurality of query records. Each query record corresponds to a search query or a group of substantially similar search queries, and indicates one or more sets of search results that the search engine provided to a requesting user device in response to the search query. Each set of search results includes one or more application identifiers respectively indicating one or more applications that were represented in the set of search results. The second number of total searches is equal to the number of sets of search results determined from all of the one or more query records.

According to some implementations of the disclosure, determining the recommendation score of the target application includes determining a first set of search queries, IMP, received by the search engine and determining the recommendation score based on IMP. IMP indicates search queries directed to finding applications available on/for the target system and that would have indicated the target application had the target application been available on/for the target system. In some of these implementations, the recommendation score is equal to a number of search queries included in IMP. In other implementations, the recommendation score is equal to a number of search queries included in IMP divided by a total number of search queries received by the search engine over a period of time and directed to finding applications on/for the target system. According to some implementations, determining the recommendation score further includes determining a second set of search queries, GP, received by the search engine. Each search query in GP is directed to finding applications on/for the target system and having positive feedback indicating a user selection of at least one search result in a set of search results provided in response to the search query. In these implementations, the method further includes determining a third set of search queries, IA, based on GP and IMP, and determining the recommendation score based on IA. In some implementations, the IA is determined according to $$IA = |IMP| - |IMP \cap GP|.$$

In some of these implementations, the recommendation score is equal to the number of search queries in IA divided by a total number of search queries received by the search engine over a period of time and directed to finding applications on/for the target system.

In some implementations, recommending the target application to the target organization includes including an application identifier of the target application in a set of recommended applications, clustering a set of application records respectively corresponding to the set of recommended applications according to one or more features defined in each of the application records, determining a category of the target application based on the clustering, and generating a report that indicates the category of the target application.

According to some implementations of the present disclosure, a method for identifying gaps in search results generated in response to search queries sent to a search engine that identifies applications implicated by the search queries is disclosed. The method includes maintaining, by a processing device, a query record datastore that stores a plurality of query records. Each query record corresponds to a search query or a group of substantially similar search queries including the search query and indicates one or more sets of search results that the search engine provided to a requesting user device in response to the search query. Each set of search results includes one or more application identifiers respectively indicating one or more applications that were represented in the set of search results. The method further includes identifying, by the processing device, a target query record from the query record datastore corresponding to a target search query, and determining, by the processing device, a query recommendation score of the target search query based on the target query record. The method further includes selecting, by the processing device, whether to recommend the target search query based on the query recommendation score, and when the target search query is selected for recommendation, recommending the target search query to a target organization.

According to some of these implementations, determining the query recommendation score includes determining a coverage rate of the search query from the query record. The coverage rate indicates an average amount of applications indicated in search results provided by the search engine in response to the target search query. In these implementations, the query recommendation score is based on the coverage rate.

According to some of implementations, each application indicated in each set of search results defined in the target query record includes a result score associated therewith. The result score indicates a degree of confidence in a match of the application to the search query. In these implementations, determining the query recommendation score includes determining a confidence value associated with the search query based on the query record and determining the query recommendation score based on the confidence value. The confidence value indicates an average result score of the applications indicated in the sets of search results stored in the query record. In some implementations of the present disclosure, each set of search results stored in the target query record includes a feedback indicator. The feedback indicator indicates whether a user selected one or more of the search results in response to being presented with the search results. In these implementations, determining the query recommendation score includes determining a click-through rate associated with the search query based on the feedback indicators stored in the target query record and determining the query recommendation score based on the click-through rate.

According to some implementations of the present disclosure, recommending the target search query includes including, by the processing device, a query identifier of the target query in a set of recommended search queries and for each search query in the set of recommended search queries, performing, by the processing device, entity recognition on the search query to identify zero or more potential entity types associated with the search query. In these implementations, recommending the target search query further includes determining, by the processing device, a category corresponding to the target search query based on the entity recognition, and generating, by the processing device, a report that indicates the category of the target query. In some implementations, determining the category includes generating a matrix based on the entity recognition. The matrix defines a first dimension indicating the search queries in the set of recommended search queries and a second dimension indicating possible entity types. The elements of the matrix indicate whether a particular search query implicates a particular entity type. In these implementations, determining the category further includes, for each entity type in the matrix, determining whether to recommend the entity type based on a number of populated elements in the matrix, and identifying the entity type as a recommended category based on the determining whether to recommend the entity type.

According to some implementations of the present disclosure, a recommendation engine is described. In some of these implementations, the recommendation engine includes a storage device and a processing device. The storage device stores a query record datastore. The query record datastore stores a plurality of query records. Each query record includes query data and query log data. The query data indicates instances where a search query was processed by a search engine and the query log data indicates one or more sets of search results provided in response to the search query by the search engine. Each set of search results includes application identifiers respectively indicating applications that were represented in the set of search results in response to the search query. The processing device executes computer executable instructions that, when executed by the processing device, causing the processing device to receive a system identifier indicating a target system, identify a target application that is unavailable on/for the target system, determine a recommendation score of the target application based on one or more of the query records stored in the query record datastore, determine whether the recommendation score exceeds a threshold, and when the recommendation score exceeds the threshold, recommend the target application to an organization affiliated with the target system based on the recommendation score.

According to some implementations of the present disclosure determining the recommendation score includes determining a first number of total search queries received by the search engine, determining a second number of total search queries received by the search engine that implicated the application in the respective search results, and determining the recommendation score based on the first number of total search queries and the second number of total searches. In some implementations, determining the second number of total search queries includes retrieving one or more query records from the query record datastore using an application identifier of the target application and, for each of the one or more query records, determining a number of sets of search results that indicate the target application. The second number of total searches is equal to the number of sets of search results determined from all of the one or more query records.

According to some implementations of the disclosure, determining the recommendation score of the target application includes determining a first set of search queries, IMP, received by the search engine and determining the recommendation score based on IMP. IMP indicates search queries directed to finding applications available on/for the target system and that would have indicated the target application had the target application been available on/for the target system. In some of these implementations, the recommendation score is equal to a number of search queries included in IMP. In other implementations, the recommendation score is equal to a number of search queries included in IMP divided by a total number of search queries received by the search engine over a period of time and directed to finding applications on/for the target system. According to some implementations, determining the recommendation score further includes determining a second set of search queries, GP, received by the search engine. Each search query in GP is directed to finding applications on/for the target system and having positive feedback indicating a user selection of at least one search result in a set of search results provided in response to the search query. In these implementations, the method further includes determining a third set of search queries, IA, based on GP and IMP, and determining the recommendation score based on IA. In some implementations, the IA is determined according to $$IA=|IMP|-|IMP \cap GP|.$$

In some of these implementations, the recommendation score is equal to the number of search queries in IA divided by a total number of search queries received by the search engine over a period of time and directed to finding applications on/for the target system.

In some implementations, the storage device further stores an application datastore that stores a plurality of application records. Each application record corresponds to an application available for at least one operating system and on at least one digital distribution platform, and defines features relating to the application. In some of these implementations, recommending the target application to the target organization includes including an application identifier of the target application in a set of recommended applications, clustering a set of application records respectively corresponding to the set of recommended applications according to one or more features defined in each of the application records, determining a category of the target application based on the clustering, and generating a report that indicates the category of the target application.

According to some implementations of the present disclosure, a recommendation engine that identifies gaps in search results generated in response to search queries sent to a search engine that identifies applications implicated by the search queries is disclosed. The recommendation engine includes a storage device and a processing device. The storage device stores a query record datastore that stores a plurality of query records. Each query record includes query data and query log data. The query data indicates instances where a search query was processed by a search engine and the query log data indicates one or more sets of search results provided in response to the search query by the search engine. Each set of search results includes application identifiers respectively indicating applications that were represented in the set of search results in response to the search query. The processing device executes computer executable instructions that when executed by the processing device, cause the processing device to identify a target query record from the query record datastore corresponding to a target search query, determine a target query recommendation score of the target query based on the target query record, determine whether the query recommendation score is below a threshold, and when the recommendation score is below the threshold, recommend the target search query to a target organization.

According to some of these implementations, determining the query recommendation score includes determining a coverage rate of the search query from the query record. The coverage rate indicates an average amount of applications indicated in search results provided by the search engine in response to the target search query. In these implementations, the query recommendation score is based on the coverage rate.

According to some of implementations, each application indicated in each set of search results defined in the target query record includes a result score associated therewith. The result score indicates a degree of confidence in a match of the application to the search query. In these implementations, determining the query recommendation score includes determining a confidence value associated with the search query based on the query record and determining the query recommendation score based on the confidence value. The confidence value indicates an average result score of the applications indicated in the sets of search results stored in the query record. In some implementations of the present disclosure, each set of search results stored in the target query record includes a feedback indicator. The feedback indicator indicates whether a user selected one or more of the search results in response to being presented with the search results. In these implementations, determining the query recommendation score includes: determining a click-through rate associated with the search query based on the feedback indicators stored in the target query record and determining the query recommendation score based on the click-through rate.

According to some implementations of the present disclosure, recommending the target search query includes including, by the processing device, a query identifier of the target query in a set of recommended search queries and for each search query in the set of recommended search queries, performing, by the processing device, entity recognition on the search query to identify zero or more potential entity types associated with the search query. In these implementations, recommending the target search query further includes determining, by the processing device, a category corresponding to the target search query based on the entity recognition, and generating, by the processing device, a report that indicates the category of the target query. In some implementations, determining the category includes generating a matrix based on the entity recognition. The matrix defines a first dimension indicating the search queries in the set of recommended search queries and a second dimension indicating possible entity types. The elements of the matrix indicate whether a particular search query implicates a particular entity type. In these implementations, determining the category further includes, for each entity type in the matrix, determining whether to recommend the entity type based on a number of populated elements in the matrix, and identifying the entity type as a recommended category based on the determining whether to recommend the entity type.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3A is a schematic illustrating an example of an application record.

FIG. 3B is a schematic illustrating an example of a query record.

Like reference symbols in the various drawings indicate like elements.

DETAILED DESCRIPTION

Figure 1:
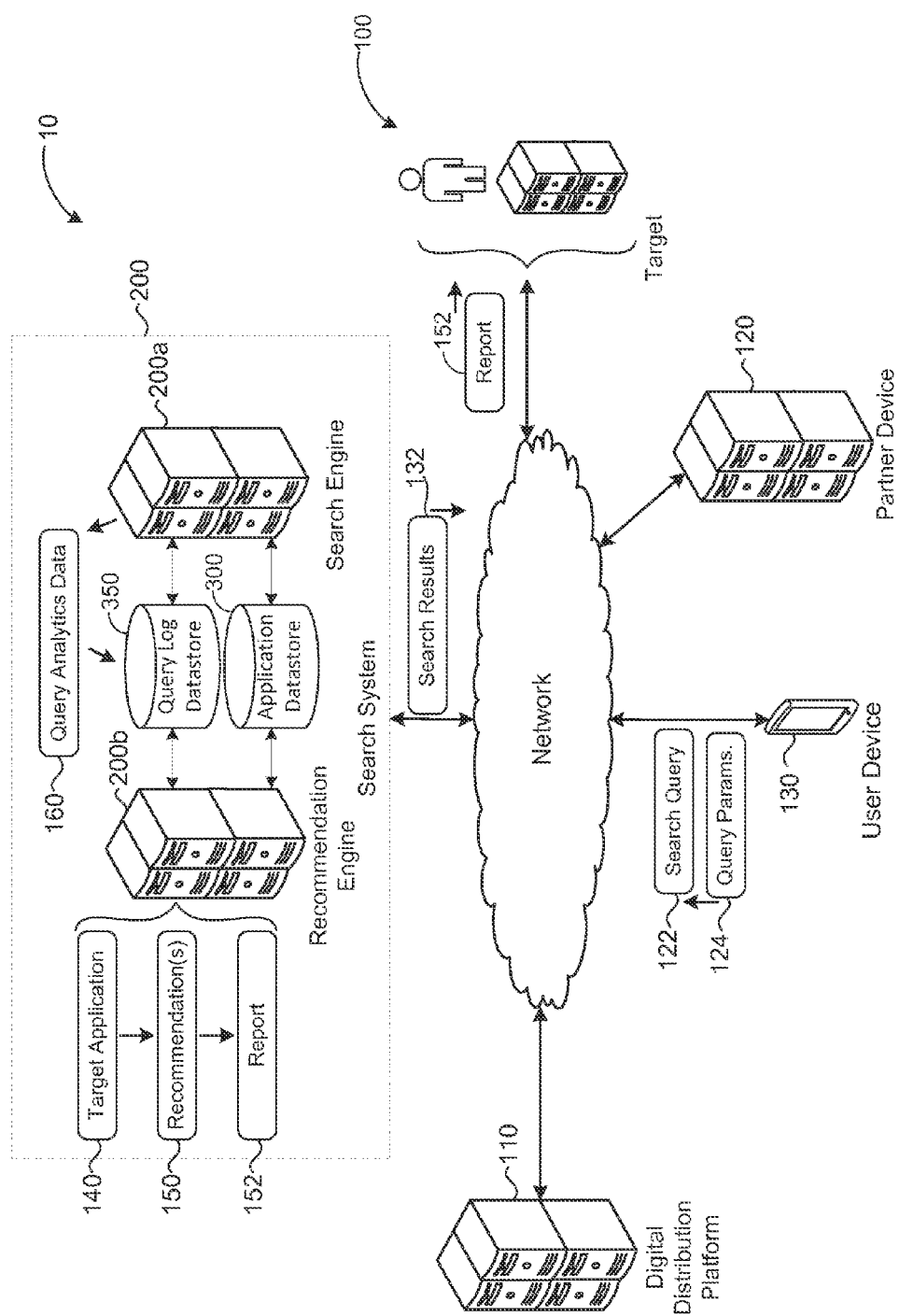
FIG. 1 is a schematic illustrating an example environment of a recommendation engine.

FIG. 1 illustrates an example environment 10 of a recommendation engine 200b. In some implementations, the recommendation engine 200b is a component of a search system 200, which also includes a search engine 200a. A search engine 200a is a combination of one or more computing devices that receives search queries 122 from a user device 130 and provides search results 132 to the user device 130 in response to the search query 122. The term user device 130 can refer to, for example, mobile devices such as smartphones and tablet computers, laptop computers, personal computers, gaming devices, vehicle infotainment systems, and smart appliances such as smart televisions and smart refrigerators. In the illustrated example, the search engine 200a is configured to perform application searches. An application search aims to identify one or more applications that are relevant to a search query 122.

An application can refer to a software product that, when executed by a computing device (or a combination of computing devices), causes the computing device (or combination of computing devices) to perform a function. In some examples, an application may also be referred to as an "app" or a "program". Example applications include, but are not limited to, productivity applications, social media applications, messaging applications, media streaming applications, social networking applications, and games. Applications can perform a variety of different functions for a user. For example, a restaurant reservation application can allow a user to make reservations for restaurants. As another example, an Internet media player application can stream media (e.g., a song or movie) from the Internet. In some examples, a single application can perform more than one function. For example, a restaurant reservation application may also allow a user to retrieve information about a restaurant, read user reviews for the restaurant, and to view the menu of the restaurant. As another example, an Internet media player application may also allow a user to perform searches for digital media, read reviews of digital media, purchase digital media, and generate media playlists. Applications can include native applications and web-based applications.

A native application is an application that is, at least in part, installed on a user device 130. In some scenarios, a native application is installed on a user device 130, but accesses an external resource (e.g., an application server) to obtain data from the external resource. For example, social media applications, weather applications, news applications, and search applications may respectively include one or more native application versions that execute on various user devices 130. In such examples, a native application can provide data to and/or receive data from the external resource while performing one or more functions of the application. In other scenarios, a native application is installed on the user device 130 and does not access any external resources. For example, some gaming applications, calendar applications, media player applications, and document viewing applications may not require a connection to a network to perform a particular function.

Some native applications may be installed on the user device 130 as part of the operating system of the user device or by the manufacturer or seller of the user device 130. Additionally or alternatively, native applications may be downloaded from a digital distribution platform 110. A digital distribution platform 110 is an electronic retail site where users can search for native applications that can be downloaded to their respective devices. Examples of digital distribution platforms include, but are not limited to, the GOOGLE PLAY digital distribution platform by Google, Inc., the APP STORE digital distribution platform by Apple, Inc., and the AMAZON APPSTORE by Amazon, Inc. A user can query the digital distribution platform 110 for an application and the digital distribution platform 110 can return search results 132 indicating set of native applications that correspond to the query. The user can select a native application for download, and the native application is downloaded and installed on the user device 130.

A web-based application (also referred to herein as a web application) may be partially executed by a user device 130 (e.g., by a web browser executed by the user device 130) and partially executed by a remote computing device (e.g., a web server or application server). For example, a web application may be an application that is executed, at least in part, by a web server and accessed by a web browser (e.g., a native application) of the user device 130. Example web applications may include, but are not limited to, web-based email, online auctions websites, social-networking websites, travel booking websites, and online retail websites.

In some scenarios, an application includes one or more native application editions of the application and one or more web application editions of the application. For example, a developer may develop two editions of an application for competing operating systems (e.g., a first native application edition for the ANDROID operating system maintained by Google, Inc., and a second native application edition for the KINDLE FIRE operating system, by Amazon, Inc.). In some scenarios, a developer may forego developing a native application edition of an application for all operating systems except for a specific operating system. In other scenarios, a digital distribution platform 110 may not carry a particular application edition, while another digital distribution platform 110 may carry the application edition. In these scenarios, users may desire a particular application, but may not be able to download the application because the available is not available for the operating system of the user device 130 and/or on the digital distribution platform 110 that the user device 130 must access.

In some implementations, the recommendation engine 200b analyzes application data, query data, and/or query log data to identify a particular application (referred to as a "target application") or category of applications (referred to as a "target category") to recommend to a target organization 100 (referred to as a "target"). A target 100 can include any organization that may be interested in receiving a recommended target application, recommended target category, or a recommended search query. For example, a target may be a digital distribution platform provider, an operating system provider, or an application developer. In one example, a digital distribution platform 110 may not offer a very popular application. It may be unaware that its customers are searching for this application or a similar application. Thus, receiving a recommendation that indicates a target application 140 or target category may result in the application becoming available on a digital distribution platform, which can increase sales of the digital distribution platform. Similarly, an operating system provider may lose customers if a particular application or category of application is never made available for the operating system. In another example, an application provider may increase sales if it were known that a particular application or category was underrepresented for a particular operating system or on a digital distribution platform. In this way, the recommendation engine 200b can aid a target in attracting new customers or keeping existing customers.

In some implementations, the recommendation engine 200b analyzes query data and query log data to identify search results 132 that are inadequate given a corresponding search query 122. In these scenarios, the recommendation engine 200b may provide the corresponding search query 122 (referred to as a "recommended search query 122) to one or more targets so that the searched for functionality may be made available to users. In other words, if users are searching for a particular functionality but the search results 132 do not cover the functionality, the recommendation engine 200b can identify a recommended search query 122 to one or more targets 100. In this way, an application may be developed that provides the searched for functionality.

The recommendation engine 200b determines that it is appropriate to provide a recommendation 150 when the recommendation engine 200b determines that there is a gap in coverage of a digital distribution platform 110 or for a particular operating system type. Typically a digital distribution platform 110 services user devices 130 running a particular operating system. Thus, the recommendation engine 200b can analyze application data (e.g., number of downloads of the application, number of reviews of the application, etc.), query data (e.g., search queries, search results, etc.), and/or query log data (e.g., user responses to search results), to identify gaps in coverage of a digital distribution platform. A gap in coverage can refer to a situation where a particular application is not available for one or more operating systems or on one or more digital distribution platforms 110. For example, a hypothetical application, XYZ, may be a very popular application with users of a first operating system (e.g., the IOS operating system by Apple Inc.) but unavailable to users of a second operating system (e.g., the ANDROID operating system maintained by Google Inc.). In such a scenario the XYZ application may be available on a first digital distribution platform 110 that makes available applications for the first operating system but unavailable on a second digital distribution platform 110 that makes available applications for the second operating system. In another scenario, first and second digital distribution platforms 110 distribute applications for a specific operating system (e.g., the ANDROID operating system), but the XYZ application may be available on the first digital distribution platform 110 but not on the second. In either scenario, the recommendation engine 200b can analyze application data of the XYZ application and/or query analytics data 160 (e.g., query data 364 (FIG. 3B) and/or query log data 364 (FIG. 3B)) corresponding to search queries 122 provided to a search engine 200a, a partner of the search engine (e.g., partner device 120), and/or either of the digital distribution platforms 110 to determine that the XYZ application should be recommended to the target 100.

In some implementations, the recommendation(s) 150 can be used to generate a report 152 that indicates the recommendation(s) 150, whereby the report 152 can be communicated to the target 100. A report 152 can be a digital document or can be generated manually from the recommendation(s). In some implementations, a report 152 can be transmitted electronically to a target 100.

As previously mentioned, a digital distribution platform 110 can refer to a system that allows a user device 130 to request an application for downloading. Put another way, a digital distribution platform 110 is an electronic retail application that makes applications available to consumers (e.g., consumers can download the applications to their respective user devices 130). Some digital distribution platforms have overlaps in coverage, in that the digital distribution platforms provide applications programmed for the same operating system (e.g., GOOGLE PLAY and AMAZON APPSTORE both service user devices running distributions of the ANDROID operating system). In some scenarios, a first digital distribution platform 110 may provide an application while a second digital distribution 110 platform does not. The recommendation engine 200b analyzes the application data of the application and/or query log data to determine whether the application should be recommended to the application to the target that maintains second digital distribution platform. For example, if the application is popular amongst users and/or appears in search results 132 often, then the recommendation engine 200b may determine that the application should be recommended to the digital distribution platform 110.

In other scenarios, an application may be available for a first operating system (e.g. the ANDROID operating system) but not available for a second operating system (e.g. the WINDOWS PHONE operating system by Microsoft Corp.). The recommendation engine 200b analyzes the application data and/or query log data to determine whether to recommend the application to a target. In this example, the target may be a digital distribution platform 110 (e.g., the WINDOWS STORE digital distribution platform by Microsoft Corp.), the operating system developer (e.g., Microsoft Corp.) or a developer of the application.

In some implementations, the recommendation engine 200b utilizes data stored and/or maintained by the search engine 200a. In some of these implementations, the search engine 200a maintains an application datastore 300 that maintains data corresponding and describing features of applications spanning various operating systems. The search engine 200a can receive search queries 122 containing one or more query terms from a user device 130 and can identify one or more applications configured for a particular operating system or available on a particular digital distribution platform 110 to include in search results 132. The user device 130 receives the search results 132 and renders the search results in a search engine results page (SERP). A SERP is a graphical user interface that presents search results 132 in a displayable format. In some implementations, each application indicated in the search results 132 is represented in a displayed search result, whereby the user can select the displayed search result to view a description of the application indicated in the search results 132 and/or access a digital distribution platform 110 where the user can elect to download the application to the user device 130. The search engine 200a can maintain query analytics data 160 regarding each search query processed by the search engine 200a in a query analytics datastore 350. For instance, the search engine 200a can identify properties of the user device 130 (e.g., operating system and/or digital distribution platform of the user device 130), the search query 122, the search results 132, and any actions that the user performed in response to the search results 132. The search engine 200a can update the query analytics datastore 350 with this information. This recommendation engine 200b leverages this information to determine recommendations 150.

Figure 2A:
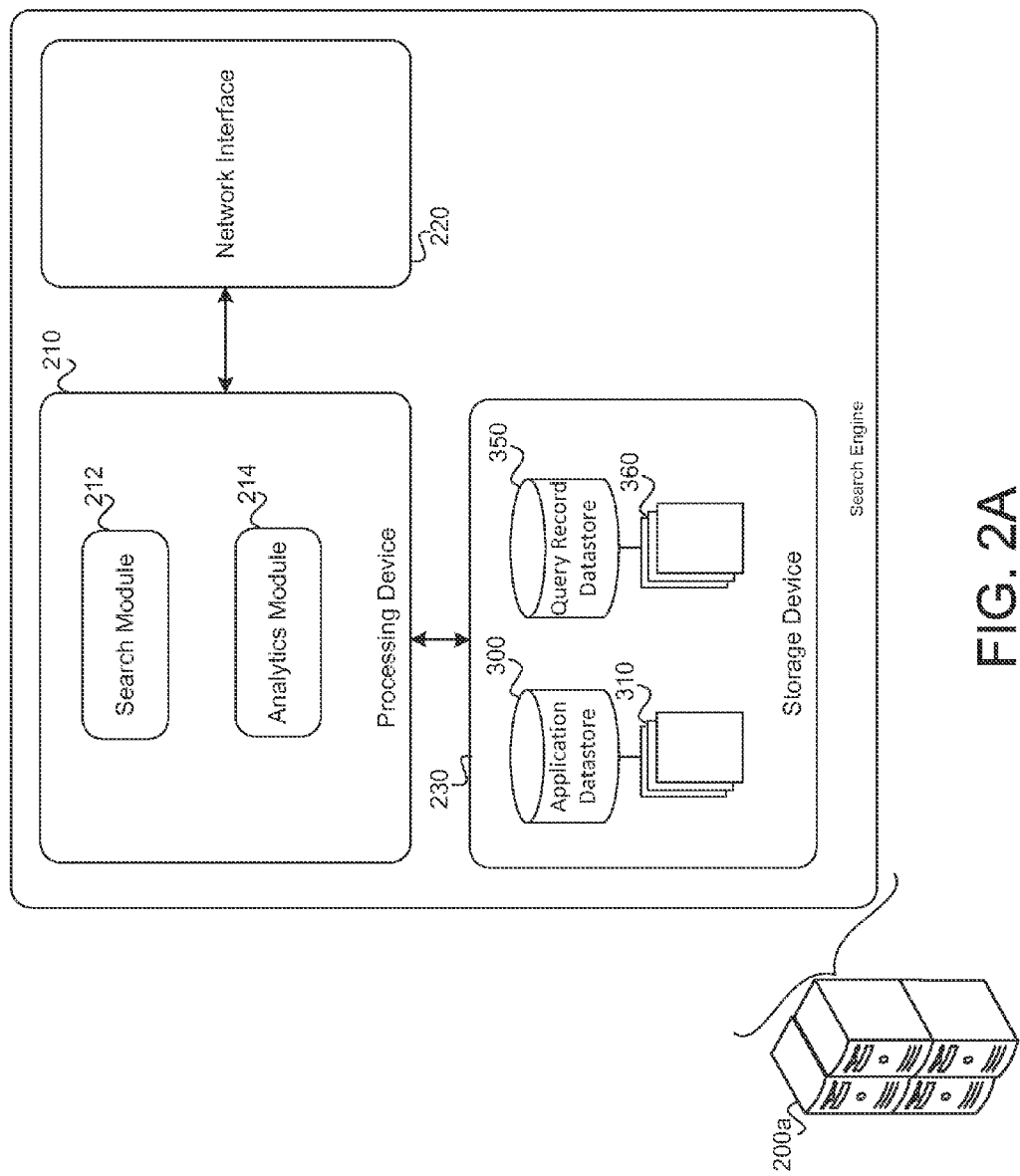
FIG. 2A is a schematic illustrating example components of a search engine.

FIG. 2A illustrates components of an example search engine 200a. The search engine 200a can include a processing device 210, a network interface device 220, and a storage device 230. The processing device 210 can execute a search module 212 and an analytics module 214. The storage device 230 can store the application datastore 300 and the query analytics datastore 350.

The processing device 210 can include memory (e.g., RAM and/or ROM) that stores computer executable instructions and one or more physical processors that execute the computer executable instructions. In implementations where the processing device 210 includes more than one processor, the processors can operate in an individual or distributed manner. Furthermore, in these implementations the two or more processors can be in the same computing device or can be implemented in separate computing devices (e.g., rack-mounted servers). The processing device 210 can execute a search module 212 and an analytics module, both of which are embodied as computer executable instructions. The processing device 210 can execute additional components not shown.

The network interface device 220 includes one or more devices that can perform wired or wireless (e.g., WiFi or cellular) communication. Examples of the network interface device 220 include, but are not limited to, a transceiver configured to perform communications using the IEEE 802.11 wireless standard, an Ethernet port, a wireless transmitter, and a universal serial bus (USB) port.

The storage device 230 can include one or more computer readable storage mediums (e.g., hard disk drives and/or flash memory drives). The storage mediums can be located at the same physical location or at different physical locations (e.g., different servers and/or different data centers). The storage device 230 can store one or more of an application datastore 300 and a query record datastore 350.

The application datastore 300 may include one or more databases, indices (e.g., inverted indices), files, or other data structures storing this data. The application datastore 300 includes application data of different applications. The application data of an application may include keywords associated with the application, reviews associated with the application, the name of the developer of the application, the platform of the application, the price of the application, application statistics (e.g., a number of downloads of the application and/or a number of ratings of the application), a category of the application, and other information. The application datastore 300 may include metadata for a variety of different applications available for a variety of different operating systems.

In some implementations, the application datastore 300 stores the application data in application records 310. FIG. 3A illustrates an example application record 310. Each application record 310 can correspond to an application and may include the application data pertaining to the application. In the illustrated implementation, the application record 310 includes an application identifier 312 ("application ID"), application information 314, application statistics 316, and digital distribution platform information 318. The application record 310 may generally represent the application data stored in the application datastore 300 that is related to an application.

The application ID 312 identifies the application record 310 amongst the other application records 310 included in the application datastore 300. In some implementations, the application ID 312 may be a string comprised of letters, numbers, and/or symbols that uniquely identifies the application record 310. In some implementations, the digital distribution platform 110 that offers an edition of the application assigns the application ID 312 to the application. In other implementations, the search engine 200 assigns application IDs 312 to each application when creating an application record 310 for the application. In some of these implementations, the search engine 200 assigns a single application ID 312 to an application, and may assign application edition IDs to the various application editions of the application.

The application information 314 may include any data that describes features of the application. The application information 314 may include a variety of different types of metadata. For example, the application features may include structured, semi-structured, and/or unstructured data. The application features may include information that is extracted or inferred from documents retrieved from other data sources (e.g., digital distribution platforms, application developers, blogs, and reviews of applications) or that is manually generated (e.g., entered by a human). The application information 314 may include the name of the developer of the application, a category (e.g., genre) of the application, a description of the application (e.g., a description provided by the developer), reviews of the application, editions of the application, the operating systems for which the application editions are configured, and/or the price of the application. The application information 314 may also include information retrieved from websites, such as comments associated with the application, articles associated with the application (e.g., wiki articles), or other information. The application information 314 may also include digital media related to the application, such as images (e.g., icons associated with the application and/or screenshots of the application) or videos (e.g., a sample video of the application).

Application statistics 316 include quantitative values regarding the application. The application statistics 316 can be obtained from documents retrieved from other data sources. Examples of application statistics 316 can include a number of downloads of the application, a number of downloads of each edition of the application, a number of reviews of the application, a number of ratings of the application, a download rate of the application (e.g., downloads per month), a review rate of the application (reviews per month), and/or a rating rate (e.g., ratings per month).

Digital distribution platform information 318 indicates the digital distribution platforms on which application editions of an application are made available. The digital distribution platform information 318 may further indicate the edition IDs of the application editions. The digital distribution platform information 318 can also include one or more access mechanisms that can be used by the user device 130 to access the digital distribution platform and download the application.

The query record datastore 350 may include one or more databases, indices (e.g., inverted indices), files, or other data structures storing this data. The query record datastore 350 includes query data pertaining to searches performed by the search engine 200a or applications performed by partner devices 120 (e.g., other search engines or digital distribution platforms). In some implementations, the query record datastore 350 stores a plurality of query records 360. FIG. 3B illustrates an example query record 360. A query record 360 can include a query ID 362, query data 364, and/or query log data 366.

The query ID 362 identifies a known search query 122 or group of substantially similar search queries 122. In some implementations, the query ID 362 is a string of letters, numbers, and/or symbols that uniquely identifies the known search query 122 or a group of similar search queries 122. A known search query 122 is a search query 122 that has been processed by the search engine 200 or a partner device 120 (e.g., another search engine 200a or a digital distribution platform 110 that includes a search engine 200a). A known search query 122 may be processed many times and may be received from many different devices. For example, the search engine 200 may processes the search query 122 "puzzle games" or "calendar applications" multiple times an hour. Thus, the query ID 362 identifies a search query 122 that has been processed by the search engine 200a or a partner device 120 N or more times, whereby N is a number greater than or equal to one. Furthermore, the query ID 362 can identify a group of search queries 122 that are substantially similar. In some implementations, a query ID 362 can identify a group of search queries 122 that recite a group of substantially similar non-stop words. For example, a single query ID 362 can identify the search queries 122 "addicting games," "addictive games," "games that are addicting," and "games that are addictive."

Query data 364 identifies statistics regarding a search query 122. Examples of query data 364 can include, but are not limited to, a number of times the search engine 200a or a partner device 120 received the search query 122 (or a search query 122 from a group of substantially similar search queries), a query rate of the search query 122 or group of search queries (e.g., queries per month), the digital distribution platform 110 of the user devices 130 from which the search queries are received (and a frequency corresponding to each digital distribution platform 110), and/or the operating systems of the user devices 130 from which the search queries 122 are received (and a frequency corresponding to each operating system). The query data 364 also includes a set of terms that represent the search query 122 or the group of search queries 122. In some implementations, the terms are represented by tokens. The query data 364 may further define one or more categories that the search query 122 is directed to. Examples of categories include "games," "puzzle games," "document readers," "productivity apps," "social networking apps," and "news apps." Query data 364 may include additional data not explicitly discussed.

Query log data 366 indicates information relating to search results 132 provided to user devices 130 in response to the search query 122 (or group of substantially similar search queries 122) and user responses to the search query. The query log data 366 can include different sets of search results 132 generated and provided in response to the search query 122. For instance, each time the search engine 200a processes a search query 122 and generates search results 132, the query log data 366 can be updated with the application IDs 312 of the applications indicated in the search results 132 corresponding to that particular instance of the search query 122. The query log data 366 can also define the result scores (discussed in further detail below) of each of the applications identified in each set of search results 132. The query log data 366 can also include user actions performed in response to each set of search results 132. Examples of user actions can include, but are not limited to, whether the user clicked on a search result corresponding to an application, whether the user selected a link to download the application, and/or whether the user downloaded the application to the user device 130 in response to the search results 132. Query log data 366 may include additional data not explicitly discussed.

Referring back to FIG. 2A, the search module 212 receives a search query 122 and in some scenarios, one or more query parameters 124 from a user device 130. As previously discussed, a search query 122 can include one or more query terms. A query parameter 124 is any value that can provide additional context to the search engine 200a. Examples of query parameters 124 can include an operating system of the user device 130 transmitting the search query 122, a digital distribution platform of the user device 130, a geolocation of the user device 130 at the time the search query was sent, and/or a time or date on which the search query 122 was sent. In some implementations, a user device 130 transmits a search query 122, and potentially, one or more query parameters in a query wrapper. A query wrapper is a data structure that the user device 130 can transmit to the search engine 200a.

The search module 212 may perform various analysis operations on the search query 122. For example, analysis operations performed by the search module 212 may include, but are not limited to, tokenization of the search query 122, filtering of the search query 122, stemming the search query 122, synonymization of the search query 122, and stop word removal.

In some implementations, the search module 212 identifies a consideration set of applications (e.g., a list of application records or application IDs) based on the tokenized search query 122. In some examples, the search module 212 may identify the consideration set by identifying applications that correspond to the search query 122 based on matches between terms of the search query 122 and terms in the application data of an application record 310. For example, the search module 212 may identify one or more applications represented in the application datastore 300 based on matches between tokens representing the terms of the search query 122 and words or tokens included in the application information 314 stored in the application records 310 of those applications. The consideration set may include a list of application records 310 and/or a list of application IDs 314 that represents identified application records 310. In some implementations, the search module 212 utilizes the APACHE LUCENE software library maintained by the Apache Software Foundation to identify application records that match to the search query 122 and/or the query parameters 124.

In some implementations, the search module 212 performs a variety of different processing operations on the consideration set to obtain the search results 132. In some implementations, the search module 212 may determine a result score for each of the application records indicated in the consideration set. A result score can indicate a degree of confidence that the search module 212 has in the match between an application record 310 and the search query 122. In some examples, the search module 212 may cull the consideration set based on the result scores of the application records contained therein. For example, the subset may be those applications that have the greatest result scores or exceed a minimum threshold. The information conveyed in the search results 132 may depend on how the search module 212 calculates the result scores. For example, the result scores may indicate the relevance of an application to the search query 122, the popularity of an application in the marketplace, the quality of an application, and/or other properties of the application.

The search module 212 may generate result scores of applications in a variety of different ways. In general, the search module 212 may determine a result score of an application record 310 based on one or more scoring features. The search module 212 may associate the scoring features with the application record 310 and/or the query 122. An application scoring feature may include any data associated with an application. For example, application scoring features may include any of the application features included in the application record 310 (e.g., application information 314 and/or application statistics 316). A query scoring feature may include any data associated with a search query 122. For example, query scoring features may include, but are not limited to, a number of words in the search query 122, the popularity of the search query 122 (e.g., the frequency at which users provide the same search query 122), and the expected frequency of the words in the search query 122. An application-query scoring feature may include any data, which may be generated based on data associated with both the application and the search query 122 (e.g., the query that resulted in the search module 212 identifying the application record 310 of the application). For example, application-query scoring features may include, but are not limited to, parameters that indicate how well the terms of the query match the terms of the identified application record 310. The search module 212 may determine a result score of an application record 310 based on at least one of the application scoring features, the query scoring features, and the application-query scoring features.

The search module 212 may determine a result score based on one or more of the scoring features listed herein and/or additional scoring features not explicitly listed. In some examples, the search module 212 may include one or more machine-learned models (e.g., a supervised learning model) configured to receive one or more scoring features. The one or more machine-learned models may generate result scores based on at least one of the application scoring features, the query scoring features, and the application-query scoring features. For example, the search module 212 may pair the query 122 with each application record 310 and calculate a vector of features for each (query, application record) pair. The vector of features may include application scoring features, query scoring features, and application-query scoring features. The search module 212 may then input the vector of features into a machine-learned regression model to calculate a result score that may be used to rank the applications in the consideration set. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels. The foregoing is one example manner by which the search module 212 can calculate a result score. According to some implementations, the search module 212 can calculate result scores in alternate manners.

The search module 212 can rank the application records 310 based on their respective result scores and/or can cull the consideration set based on the results scores of the indicated application records 310. The search module 212 can generate the search results 132 based on the ranked and/or culled consideration set of scored application records 310. Furthermore, in some implementations the search module 212 can cull the application records 310 based on the availability of the application for a particular operating system or on a particular digital distribution platform 110. For instance, if an application record 310 represents an application that is not available for the operating system of the user device 130 that transmitted the search query 122, the application record 310 may be removed from the consideration set. Similarly, if the application is not available on a digital distribution platform 110 that the user device 130 can access, the application record 310 of the application is removed from the consideration set.

The search module 212 can generate a result object for each application that is to be indicated in the search results 132. A result object is a data structure that contains information that the user device 130 uses to generate a displayed search result. The search module 212 can include any suitable data in a result object. For example, the search module 212 can include a title of the application, a description of the application, an icon of the application, a screen shot of the application, a result score of the application, and/or a resource identifier (e.g., a URL) where the application may be downloaded. The result object may further define a layout of the displayed search result and instructions for generating the displayed search result. The search module 212 may utilize a template that defines the structure of a result object and populates the template using information contained in the scored application record 310 corresponding to the application represented by the result object. The search module 212 can transmit a set of one or more result objects to the user device 130 in the search results 132.

The user device 130 receives and renders the search result 132. The user device 130 presents the rendered search results 132 in the SERP as a collection of displayed search results. The analytics module 214 monitors the interaction of the user with the displayed search results 132, and updates the query record datastore 350 based on the contents of the search results 132 and/or the interaction of the user with the search results 132. In particular, the user device 130 may execute a client application or a script that reports various information to the analytics module 214. The analytics module 214 can also monitor the search module 212 to identify the contents of the search results 132 to update the query record datastore 350.

In some implementations, the analytics module 214 monitors each search query 122 that is transmitted to the search engine 200a. Each time the search module 212 analyzes a search query 122 (e.g., tokenizes, removes stop words from, synonymizes, and/or stems a search query 122) the analytics module 214 can determine whether the query analytics datastore 350 includes a query record 360 corresponding to the analyzed search query 122. If so, the query analytics module 214 updates the existing query record 360 with information that the analytics module 214 collects. For example, the query analytics module 214 can update the query data 364 to indicate that the search query 122 has been received again and the operating system of the user device 130 that transmitted the search query 122. The query analytics 214 may also assign a timestamp to the search query 122, whereby the query record 360 reflects the date and/or time when the search query 122 was received. The query analytics module 214 may also recalculate and update the query rate of the search query 122. Otherwise, the analytics module 214 creates a new query record 360 and populates the new query record 360 with information that the analytics module 214 collects. The analytics module 214 can generate a new query ID 362 for the new query record 360. The analytics module 214 can assign the terms of the search query 122 to the query data of the new query record 360. Further, the query analytics module 214 can add new statistics to the query data 364. For example, the query analytics module 214 can update the number of times the query 122 has been received to equal one.

When the search module 212 determines a set of search results 132, the search module 212 can report the contents of the search results 132 to the analytics module 214. For example, the search module 212 can identify each application indicated by the search results 132 and the result scores thereof. The analytics module 214 can update the query log data 366 of the query record 360 corresponding to the search query 122 to indicate the applications indicated by the search results 132, as well as the result scores thereof.

In some implementations, the analytics module 214 receives user feedback from user devices 130 in response to the search results 132. User feedback can include actions performed by a user of a user device 130 in response to the search results 132. For example, when a user selects a displayed search result, the user device 130 may present additional information to the user. For example, the user device 130 may display a description of the application, one or more screen shots of the application, and a selectable link that links to a digital distribution platform 110. In response to the user selecting a displayed search result, a client application (e.g., a search application executed by the user device 130) can provide feedback to the analytics module 214 indicating that the user has selected a particular displayed search result. In another example, a user may elect to download an application. In such a scenario, the user may select a selectable link corresponding to the application to access a digital distribution platform 110 from which the application may be downloaded. In this scenario, the client application can provide feedback to the analytics module 214 indicating that the user has selected a link to download the application. The analytics module 214 receives the user feedback and updates the query record 360 corresponding to the search query 122 based on the user feedback. In the event the user feedback indicates that a displayed search result of a particular application was selected, the analytics module 214 updates the query log data 366 of the query record 360 corresponding to the search query 122 to indicate that the displayed search result was selected by the user. In the event the user feedback indicates that a user elected to download an application (or access a digital distribution platform where the application may be downloaded), the analytics module 214 updates the query log data of the query record 360 of the search query 122 to indicate that the application was downloaded (or likely downloaded) to the user device 130. In either of these scenarios, the analytics module 214 treats these actions as "positive" feedback. If the user does nothing or sends a new search query, the analytics module 214 can treat these types of actions (or non-actions) as "negative" feedback. The analytics module 214 can update the query log data 364 to indicate the negative feedback.

Figure 2B:
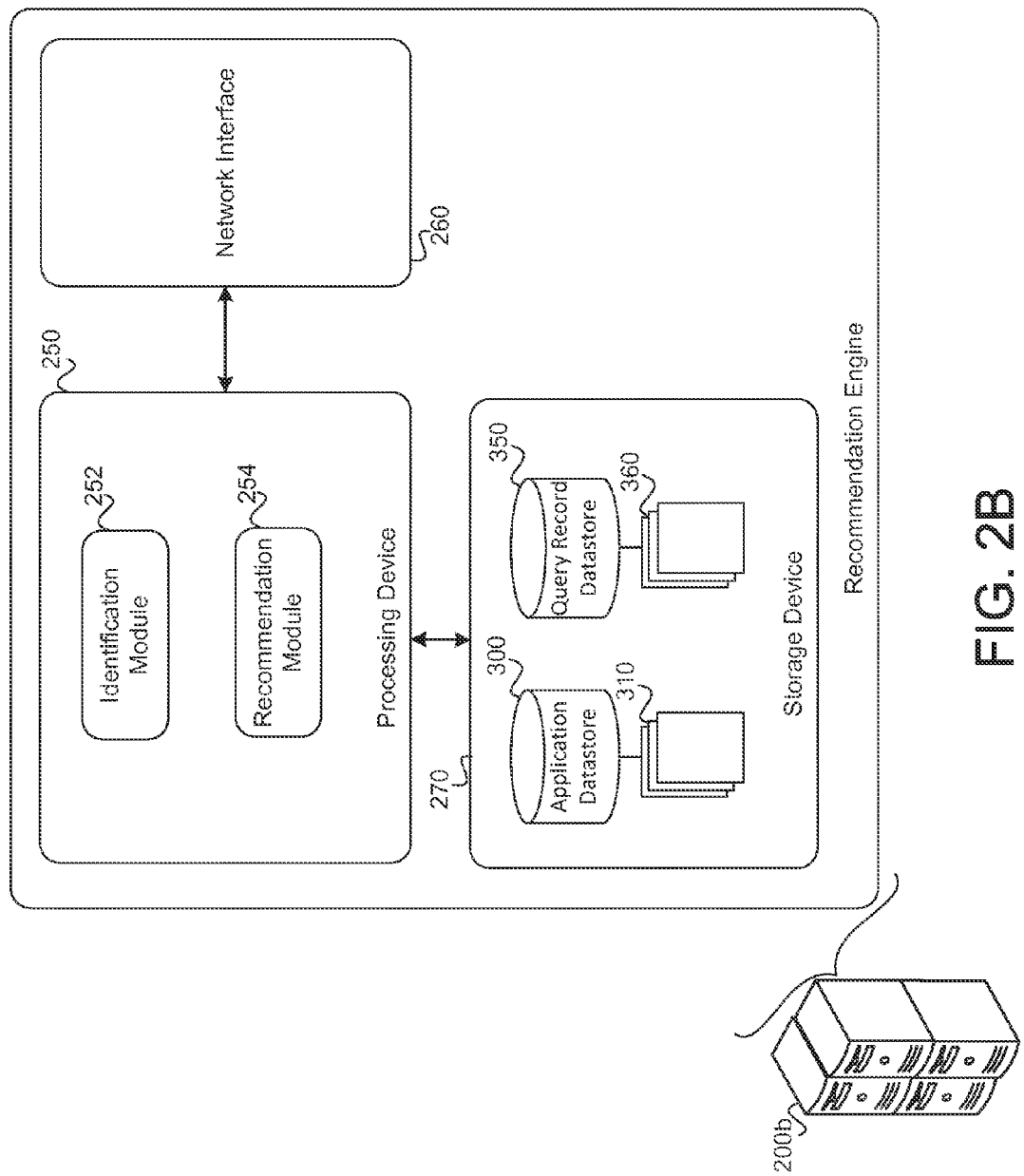
FIG. 2B is a schematic illustrating example components of a recommendation engine.

FIG. 2B illustrates an example set of components of a recommendation engine 200b. The recommendation engine 200b can include a processing device 250, a network interface device 260, and a storage device 270. These components may be shared with the components of the search engine 200a or may be separate from the components of the search engine 200a. In either scenario, the processing device 250, the network described with respect to the processing device 210, the network interface device 220, and the storage device 230 of the search engine 200a. The processing device 250 can execute an identification module 252 and a recommendation module 254, both of which may be embodied as computer executable instructions.

The identification module 252 identifies target applications 140, target categories, and/or target search queries 122. A target application 140 is an application that may potentially be recommended to a target 100. A target application 140 may be an application that does not include an application edition that is available on a particular digital distribution platform 110 and/or that is not available for a particular operating system. In some implementations, the identification module 252 analyzes the application records 310 stored in the application datastore 300 to identify target applications 140. A target category is a category that may be recommended to a target 100. A target category may be a category of applications that is represented on a digital distribution platform or for an operating system but not available or underrepresented on another digital distribution platform or for another operating system. A target search query is a search query 122 that can be recommended to a target 100. A target search query can be any search query 122 received by a search engine 200a or a partner device 120. The identification module 252 receives a target operating system or a target digital distribution platform and searches the application datastore 300 to identify applications or categories of applications that are not available on the target digital distribution platform or the target operating system. The identification module 252 outputs a list of one or more target applications 140 or target categories. Additionally or alternatively, the identification module 252 can iterate through the query record datastore 350 to identify search queries 122 to provide to the recommendation module 254.

Figure 8:
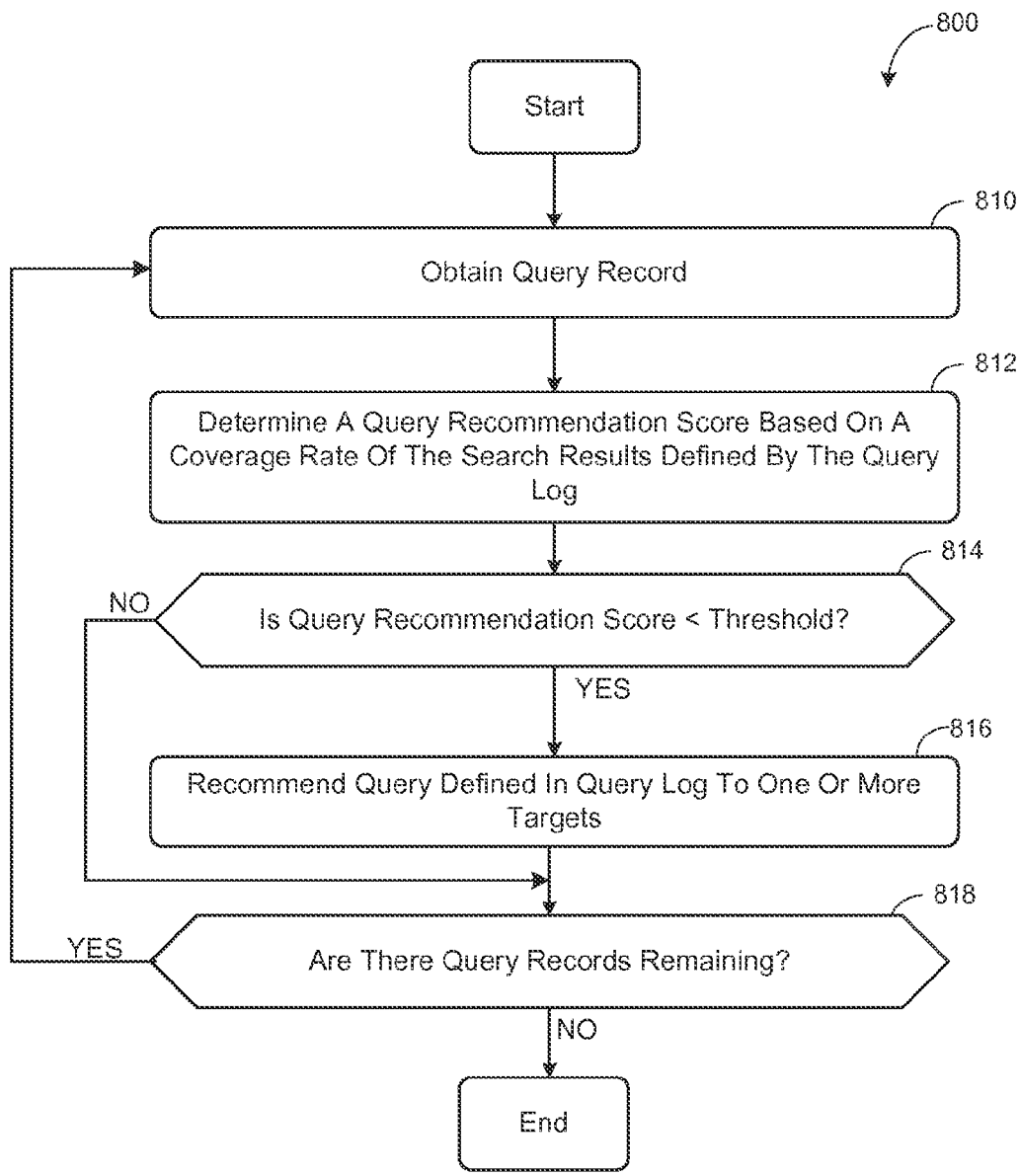
FIG. 8 is a flow chart illustrating an example set of operations of a method for recommending a search query having inadequate search results to a target.
Figure 9:
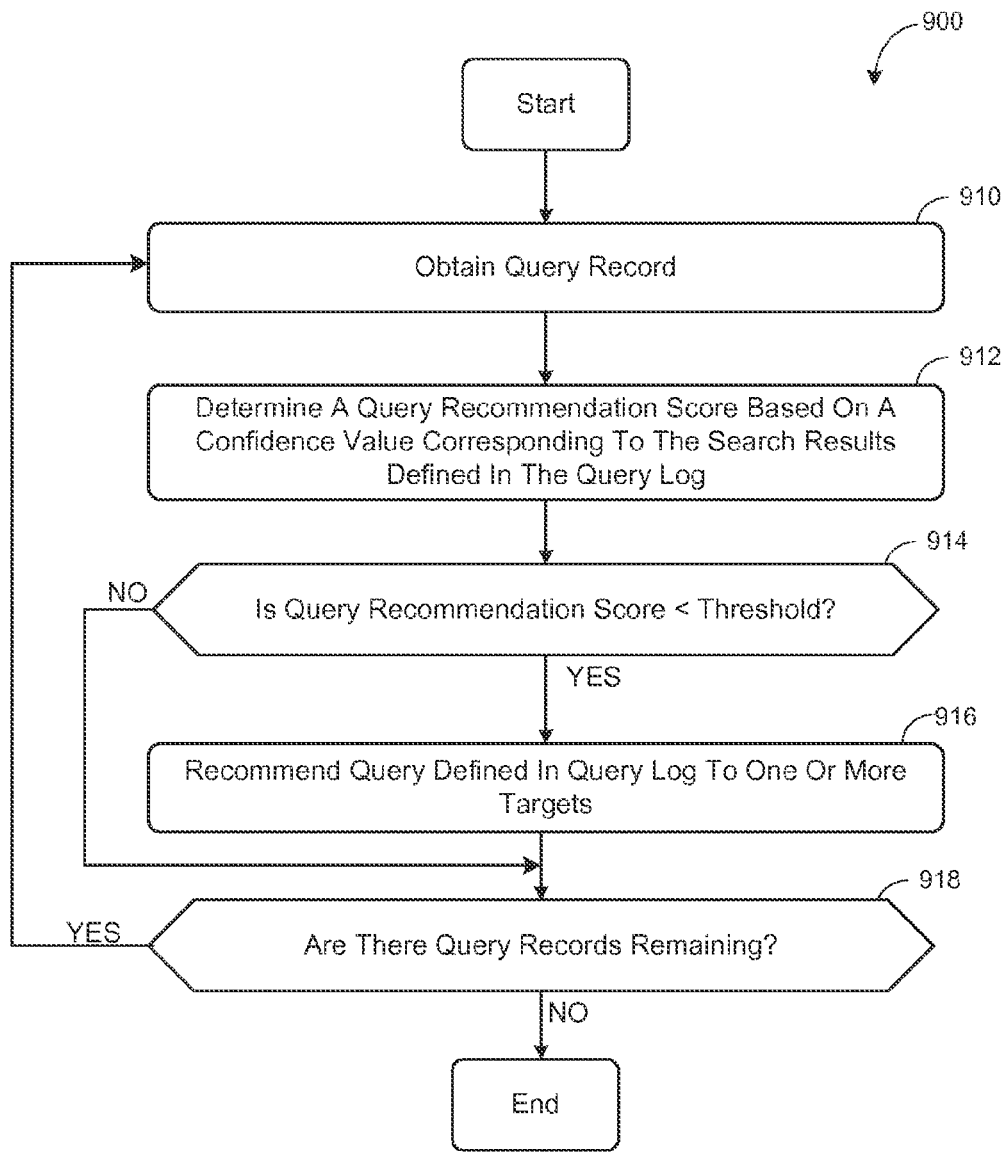
FIG. 9 is a flow chart illustrating an example set of operations of a method for recommending a search query having inadequate search results to a target.
Figure 10:
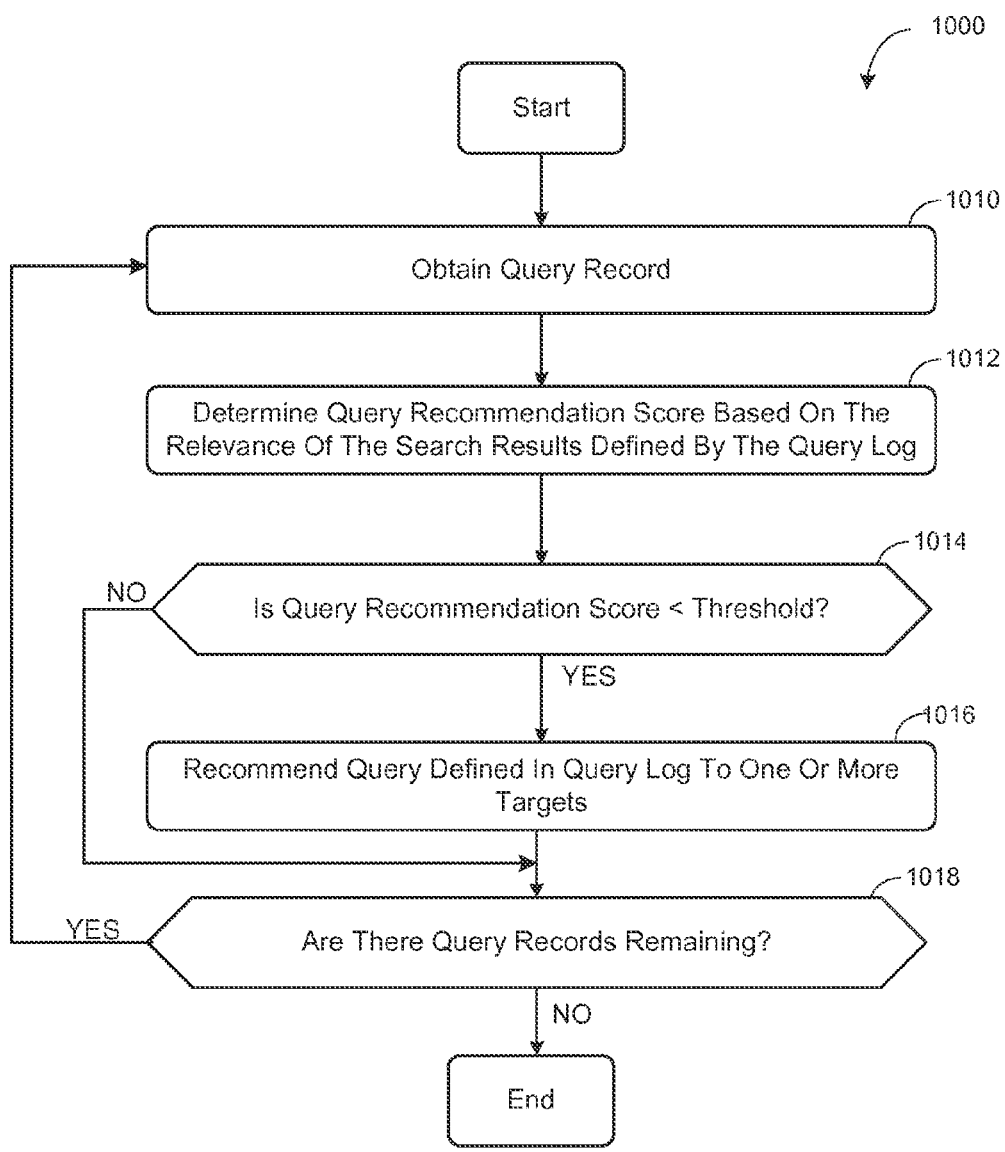
FIG. 10 is a flow chart illustrating an example set of operations of a method for recommending a search query having inadequate search results to a target.

In some implementations, the recommendation module 254 receives an application ID 312 of a target application 140 and determines whether to recommend the target application 140 to the target. The recommendation module 254 can analyze an application record 310 of the application and/or query analytics data of the query records that would have implicated the application to determine a recommendation score of the target application 140. The recommendation module 254 can determine whether to recommend the target application 140 based on the recommendation score. FIGS. 4-7 illustrate example methods for determining whether to recommend a target application 140. In variations of the methods of FIGS. 4-7, the recommendation module 254 may identify categories of applications to recommend to a target instead of single applications. FIGS. 8-10 illustrate example methods for determining search queries 122 to recommend to a target. In these implementations, the recommendation engine 200b can recommend search queries 122 to the target 100 which may implicate an underrepresented application function. For example, if users continuously search for applications relating to 3-D printing but the search results 132 do not provide meaningful results, the recommendation engine 200b can provide the search queries 122 to application developers, so that they may be aware of the need in the marketplace.

Figure 11:
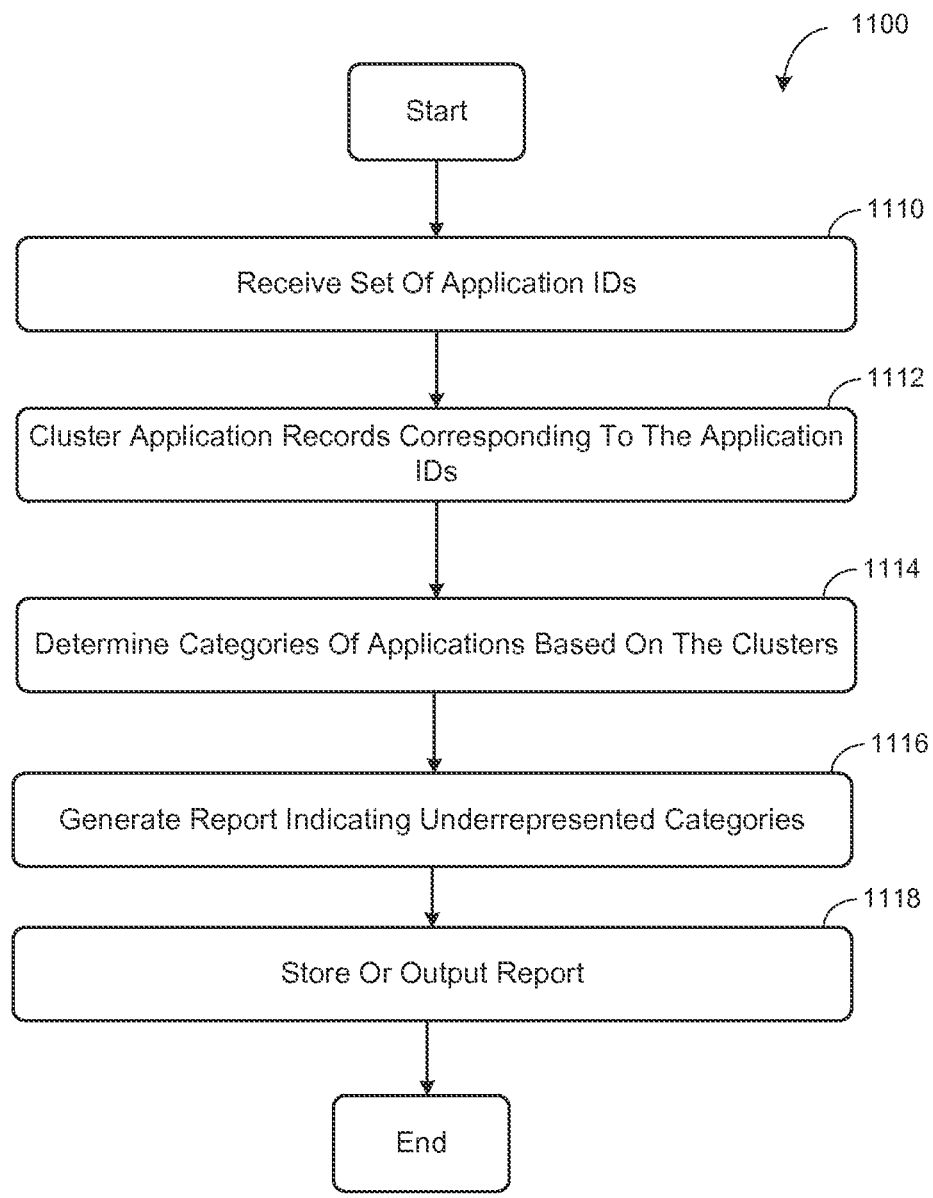
FIG. 11 is a flow chart illustrating an example set of operations of a method for determining a category of a missing application and generating a report based thereon.

In some implementations, the recommendation module 254 generates a report 152 based on the recommendations 150 determined by the recommendation module 254. In some implementations, the recommendation module 254 receives a set of recommended applications that can include one or more application IDs. The recommendation module 254 can generate the report to indicate the missing applications based on the set of recommended applications. For example, the recommendation module 254 can create a text document and can include a list of application IDs of the applications, the names of the applications, and related statistics that were used to identify each of the missing application. In other implementations, the recommendation module 254 can determine categories of missing applications based on the set of recommended applications. FIG. 11 illustrates an example method 1100 for determining the categories of missing applications and generating a report based thereon.

Figure 12:
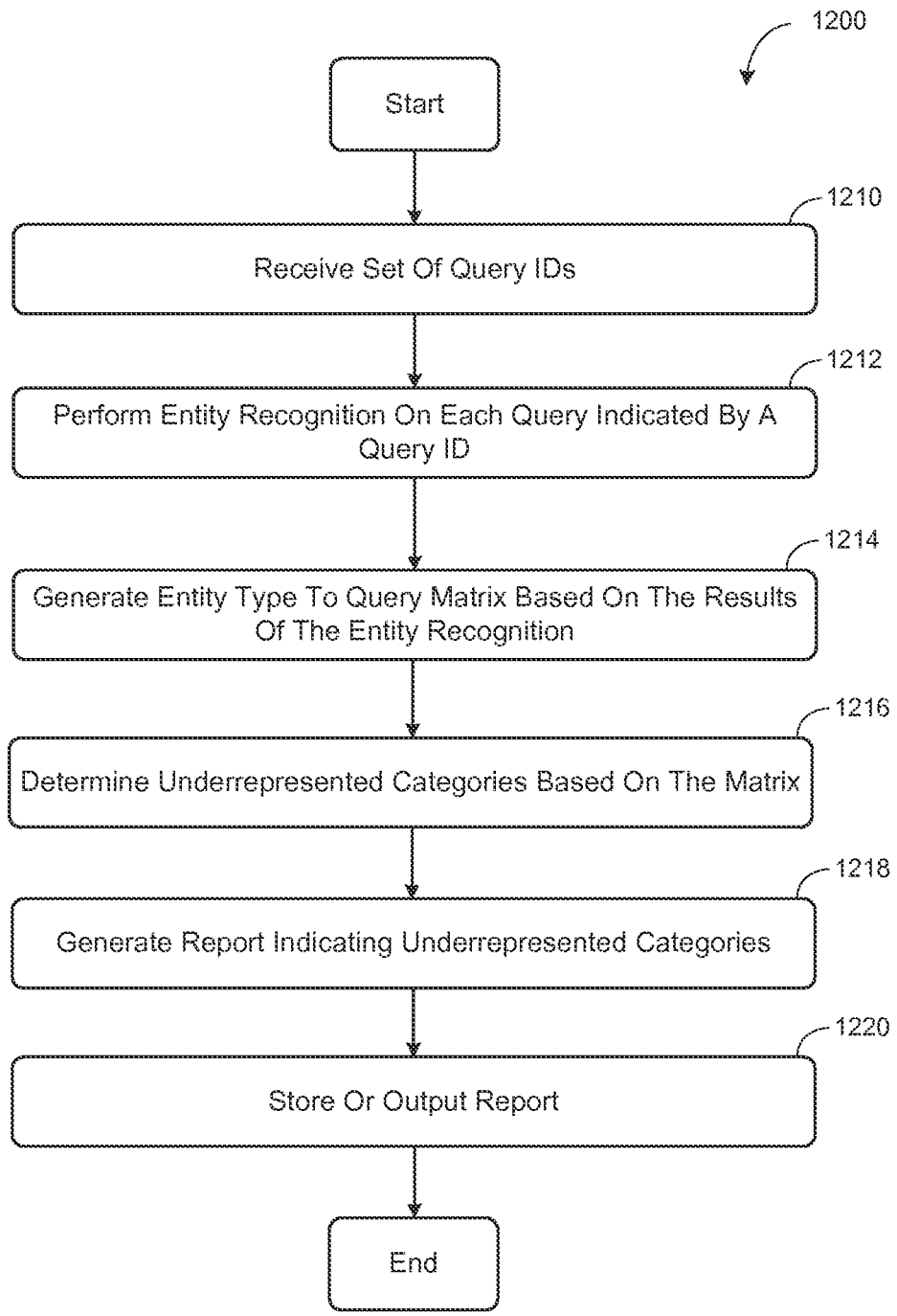
FIG. 12 is a flow chart illustrating an example set of operations of a method for determining a category of a search query and generation a report based thereon.

In some implementations, the recommendation module 254 receives a set of search queries 122 that do not produce adequate search results 132 and generates a report 152 based thereon. In these implementations, the recommendation module 254 can generate the report 152 to indicate the search queries 122 based on the set of queries. For example, the recommendation module 254 can create a text document and can include a list of the queries 122 and the statistics that were used to recommend the queries 122. In other implementations, the recommendation module 254 can determine categories corresponding to the queries identified in the set of search queries 122 and can generate a report 152 based thereon. FIG. 12 illustrates an example method 1100 for determining the categories of search queries 122 that do not produce adequate search results 132.

Figure 4:
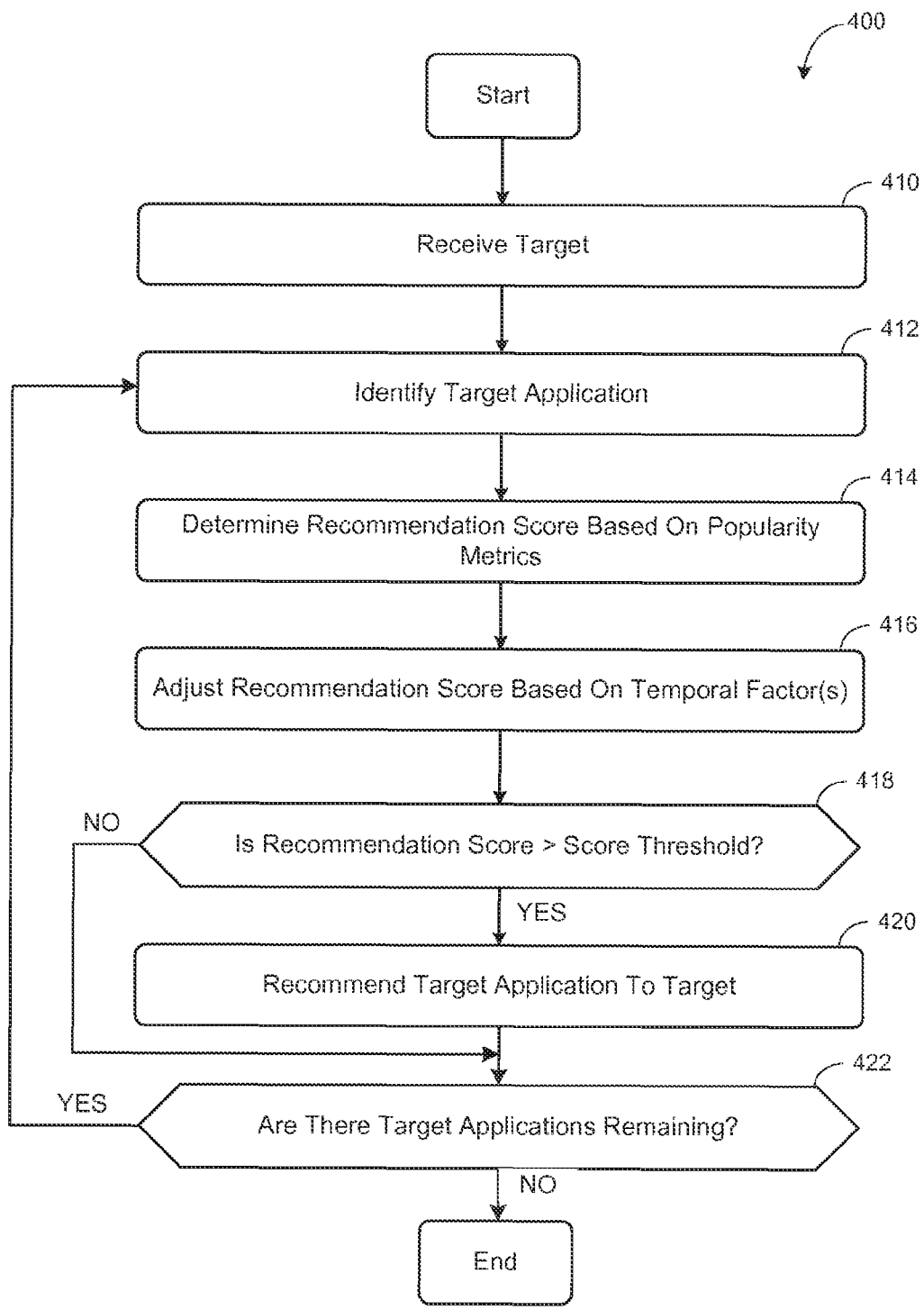
FIG. 4 is a flow chart illustrating an example set of operations of a method for recommending an application to a target.

FIG. 4 illustrates an example set of operations of a method 400 for determining whether to recommend one or more target applications 140. For purposes of explanation, the method 400 is described with respect to the components of the recommendation engine 200b.

At operation 410, the identification module 252 receives a target system and a target. The target system can indicate a digital distribution platform and/or an operating system. The target can indicate a digital distribution platform provider, an operating system developer, or an application developer. Receiving a target system and a target can include receiving a system identifier (e.g., a string) representing the target system and a target identifier (e.g., a string) that identifies the target. In some implementations, the system identifier is a name of the target system and the target identifier is a name of an organization affiliated with the target system.

At operation 412, the identification module 252 identifies a target application 140. A target application 140 can refer to a native application edition that is not available on/for the target system. For instance, a target application 140 can refer to a native application edition that is unavailable on a digital distribution platform or for a particular operating system. In some implementations, the identification module 252 iterates through the application records 310 stored in the application datastore 300. For each application record 310, the identification module 252 determines whether the application is available on/for the target system. If the target application 140 is unavailable, then the application is treated as a target application, and the application ID thereof is output to the recommendation module 254. The identification module 252 can identify target applications 140 in other manners as well.

At operation 414, the recommendation module 254 determines a recommendation score of the target application 140 based on one or more popularity metrics. Popularity metrics are statistics that tend to illustrate the overall popularity of an application. Examples of popularity metrics can include a total amount of downloads of the application, a total number of ratings of the application, a total number of reviews of the application, and/or a quantative rating of the application (e.g., three stars out of five), the number of times the application has appeared in search results 132 over a period of time (e.g., over the past week), the number of downloads of the application in a particular geographic area (e.g., in a particular country, state, or city), and/or the number of times an application is mentioned in media articles or social network postings. The recommendation module 254 can obtain these statistics from the application record 310 of the target application 140. In some implementations, the recommendation module 254 normalizes the statistics with respect to a maximum value. For instance, if the target application 140 has been downloaded one million times and the most downloaded application has been downloaded ten million times, the download statistic may be normalized to, for example, 0.1 (i.e., 1M/10M). Similarly, if the target application 140 has received nine hundred thousand reviews and the most reviewed application has received one million reviews, the review statistic may be normalized to, for example, 0.9 (i.e., 900,000/1,000,000). The recommendation module 254 can normalize the statistics in any other suitable manner, and may also normalize the statistics based on a category of the application (e.g., normalizing the statistics of a news application with respect to the statistics of a most popular news application).

The recommendation module 254 can determine the recommendation score based on the statistics (normalized or otherwise). In some implementations, the recommendation module 254 sets the recommendation score equal to the value of one of the statistics (normalized or otherwise). For example the recommendation module 254 can set the recommendation score equal to the normalized download statistic. In other implementations, the recommendation module 254 determines the recommendation as a function of two or more of the statistics. For example, the recommendation score can be a function of a total number of downloads and the quantative rating of the application. For example, the recommendation score may be equal to the product of a normalized number of downloads and the quantative rating of the application.

At operation 416, the recommendation module 254 can adjust the recommendation score by a temporal factor, according to some implementations of the method 400. A temporal factor is a value that indicates a more recent trend in the target application's popularity. For example, the download rate over the previous n months (e.g., download rate over the last three months) may be more telling than an overall download number. If an application was extremely popular years ago, the application may have a tremendous amount of downloads but may not have a high current download rate. In some implementations, recommendation module 254 obtains the temporal factor from the application record 310 of the target application 140. The recommendation module 254 can normalize the temporal factor with respect to the most currently popular application. In some implementations, the recommendation module 254 adjusts the recommendation score by multiplying the recommendation score with the temporal factor (normalized or otherwise).

At operation 418, the recommendation module 254 determines whether the recommendation score exceeds a threshold. The value of the threshold may be manually programmed or may be learned by a machine learning algorithm. If the recommendation score exceeds a threshold, the recommendation module 254 recommends the target application 140 to the target, as shown at operation 420. In some implementations, the recommendation module 254 recommending the target application 140 includes adding the application ID of the target application 140 to a set of recommended applications. In these implementations, the set of recommended applications can be used to generate a report that is provided to the target.

At operation 422, the recommendation module 254 determines whether there are any remaining target applications 140 to analyze. If so, the recommendation module 254 identifies a next target application, as show at operation 412. If not, the recommendation module 254 can output the set of recommended applications (e.g., to the target 100) and/or can store the set of recommended applications on the storage device 270. The set of recommended applications may be used to generate a report 152.

The method 400 of FIG. 4 is provided for example. Variations of the method 400 are contemplated. For example, the identification module 252 can identify categories of applications that are not represented or underrepresented on a digital distribution platform and/or for an operating system. In these implementations, the recommendation module 254 can consider the popularity metrics of a representative set of applications across the category of applications. In this way, the recommendation module 254 can determine a popular category that is underrepresented or not represented on a target system.

Figure 5:
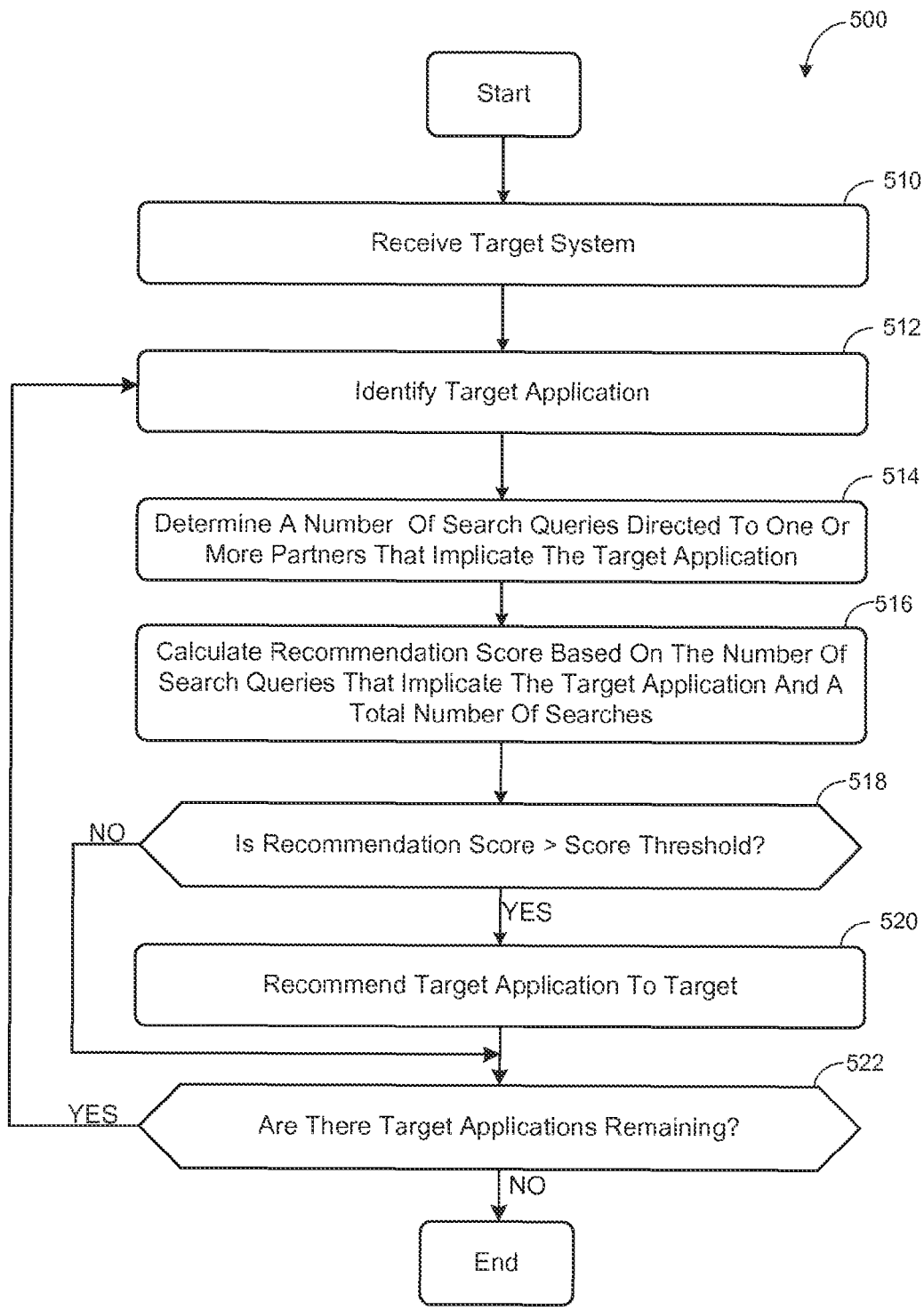
FIG. 5 is a flow chart illustrating an example set of operations of a method for recommending an application to a target.

FIG. 5 illustrates an example set of operations of a method 500 for determining whether to recommend one or more target applications 140 based on query data 364 and query log data 366. For purposes of explanation, the method 500 is described with respect to the recommendation engine 200b of FIG. 2B.

At operation 510, the identification module 252 receives a target, as was described with respect to operation 410 of FIG. 4. At operation 512, the identification module 252 determines a target application 140. The identification module 252 can identify a target application 140 in any suitable manner, as was described with respect to operation 412 of FIG. 4.

At operation 514, the recommendation module 254 determines a number of search queries 122 that were provided to the search engine 200a (or a partner device) that implicate the target application 140. A search query 122 can be said to implicate a target application 140 if the search results 132 produced in response to the search query 122 indicate the target application 140. Put another way, if the target application 140 appears in search results 132 resulting from the processing of a search query 122, the search query 122 can be said to implicate the target application 140. In some implementations, the recommendation module 254 searches the query record datastore 350 for all query records 360 that list the target application 140 in the query log data 366. For example, the recommendation module 254 can search the query record datastore 350 using the application ID 312 of the target application 140 to identify any query record 360 that lists the application ID in at least one of the logged search results 132. The recommendation module 254 can then analyze each identified query record 360 to determine in how many sets of search results 132 was the target application 140 indicated. The cumulative number of sets of search results 132 in which the target application 140 appears across all query records 360 can be the total number of search queries that implicate the target application 140.

At operation 516, the recommendation module 254 determines the recommendation score of the target application 140 based on the total number of search queries 122 that implicate the target application 140 and a total number of search queries 122 received by the search engine 200a. In some implementations, the recommendation module 254 determines the recommendation score according to:

$$RS = \frac{T_{App}}{T_{Total}} \tag{1}$$

where RS is the result score, $T_{App}$ is the total number search queries 122 that implicate the target application, and $T_{Total}$ is the total number of search queries 122 received by the search engine 200a.

At operation 518, the recommendation module 254 determines whether the recommendation score exceeds a threshold. The value of the threshold may be manually programmed or may be learned by a machine learning algorithm. If the recommendation score exceeds a threshold, the recommendation module 254 recommends the target application 140 to the target, as shown at operation 520. In some implementations, the recommendation module 254 adds the application ID of the target application 140 to a set of recommended applications. In these implementations, the set of recommended applications can be used to generate a report 152 that is provided to the target.

At operation 522, the recommendation module 254 determines whether there are any remaining target applications 140 to analyze. If so, the recommendation module 254 identifies a next target application, as shown at operation 512. If not, the recommendation module 254 can output the set of recommended applications and/or store the set of recommended applications on the storage device 270.

The method 500 of FIG. 5 is provided for example. Variations of the method are contemplated and are within the scope of the scope of the disclosure. In some implementations, the recommendation module 254 may be configured to limit the total searches to specific categories. For example, the recommendation module 254 may consider the total number of search queries 122 pertaining to a particular category (e.g., $T_{Action\_Games}$, $T_{Organization\_Apps}$, or $T_{EReaders}$). In this way, popular applications in niche categories may still be recommended, even though the ratio of the number of search queries 122 implicating the target application 140 with respect to the total number of search queries is relatively low. Additionally or alternatively, the total number of searches ($T_{Total}$) can be adjusted according to other criteria. For example, the total number of searches can be limited to search queries 122 in a certain language (e.g., Spanish queries only), country of origin (e.g., search queries 122 coming from China only), and/or operating system type (e.g., search queries 122 from ANDROID devices only).

Figure 6:
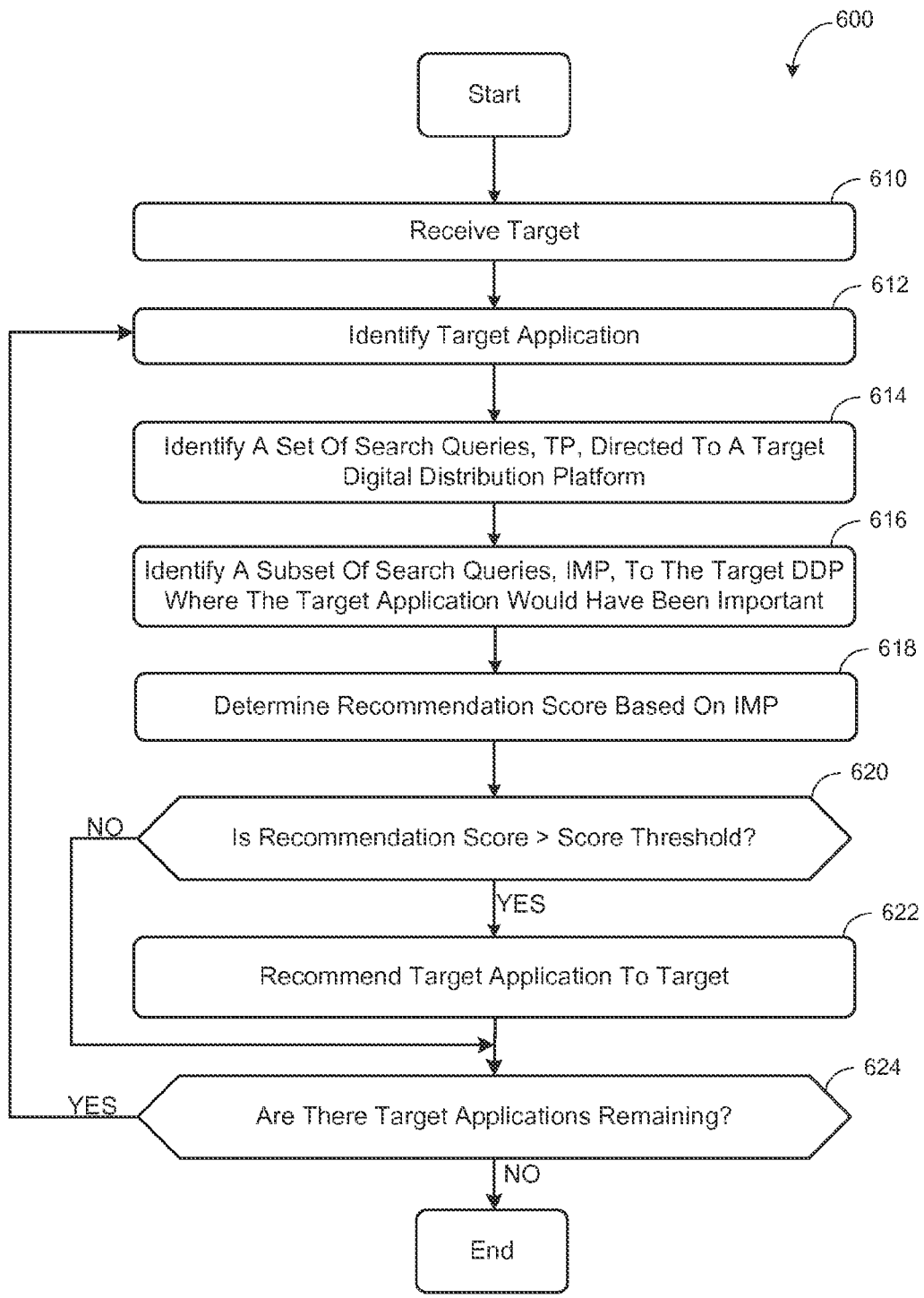
FIG. 6 is a flow chart illustrating an example set of operations of a method for recommending an application to a target.

FIG. 6 illustrates an example set of operations of a method 600 for determining whether to recommend one or more target applications 140 based on query log data 366. For purposes of explanation, the method 600 is described with respect to the recommendation engine 200b of FIG. 2B.

At operation 610, the identification module 252 receives a target, as was described with respect to operation 410 of FIG. 4. At operation 612, the identification module 252 determines a target application 140. The identification module 252 can identify a target application 140 in any suitable manner, as was described with respect to operation 412 of FIG. 4.

At operation 614, the recommendation module 254 determines a set of search queries 122 directed to a particular target system (TP). For example, the recommendation module 254 can determine a set of search queries 122 that were directed to a target digital distribution platform 110 or a target operating system. The recommendation module 254 can search the query record datastore 300 for search queries 122 that were unrestricted with respect to the system genus of the target system (e.g., not restricted by digital distribution platform or not restricted by operating system type) or that were restricted to the target system (search results 132 only for a target digital distribution system or target operating system). In other implementations, the set of TP may be provided by the target. For example, a target digital distribution platform 110 may provide a set of query records 360 indicating all the search queries 122 received by the target digital distribution platform 110.

At operation 616, the recommendation module 254 determines a set of search queries 122 where the target application 140 would have been implicated by the search query 122 had the target application 140 been available on/for the target system. The recommendation module 254 can identify the searches in TP where the search results 132 do not indicate the target application 140. The recommendation module 254 can then have the search engine 200a execute searches using the identified search queries. In some implementations, the recommendation module 254 can create a temporary application record 310 for the target application 140 that indicates that the target application 140 is available on/for the target system. The temporary application record 310 can mirror the application record 310 of the target application 140 in every other way, except that the temporary application record 310 indicates that the target application 140 is available on/for the target system. The temporary application record 310 is temporarily stored in the application datastore 300. The recommendation module 254 then has the search engine 200a perform searches for the search queries 122 contained in TP that do not result in search results 132 that indicate the target application 140. Each time the search engine 200a returns search results 132 that indicate the target application, the recommendation module 254 includes the search result 132 that triggered the search results in a set of "important" search queries, IMP. IMP indicates search queries 122 that would have implicated the target application 140 had the target application 140 been available on/for the target system.

At operation 618, the recommendation module 254 determines a recommendation score based on IMP. In some implementations, the recommendation module 254 sets the recommendation score equal to the number of search queries 122 contained in IMP. Alternatively, the recommendation module 254 can set the recommendation score equal to the number of search queries 122 in IMP divided by the number of search queries 122 in TP.

At operation 620, the recommendation module 254 determines whether the recommendation score exceeds a threshold. The value of the threshold may be manually programmed or may be learned by a machine learning algorithm. If the recommendation score exceeds a threshold, the recommendation module 254 recommends the target application 140 to the target, as shown at operation 622. In some implementations, the recommendation module 254 adds the application ID of the target application 140 to a set of recommended applications. In these implementations, the set of recommended applications can be used to generate a report that is provided to the target.

At operation 624, the recommendation module 254 determines whether there are any remaining target applications 140 to analyze. If so, the recommendation module 254 identifies a next target application, as show at operation 612. If not, the recommendation module 254 can output the set of recommended applications and/or store the set of recommended applications on the storage device 270.

The method 600 of FIG. 6 is provided for example. Variations of the method 600 are contemplated and are within the scope of the scope of the disclosure. For example, the recommendation module 254 may consider the total number of search queries 122 pertaining to a particular category (e.g., $T_{Action\_Games}$, $T_{Organization\_Apps}$, or $T_{EReaders}$). In these implementations, the determination of IMP would be limited to particular categories.

Figure 7:
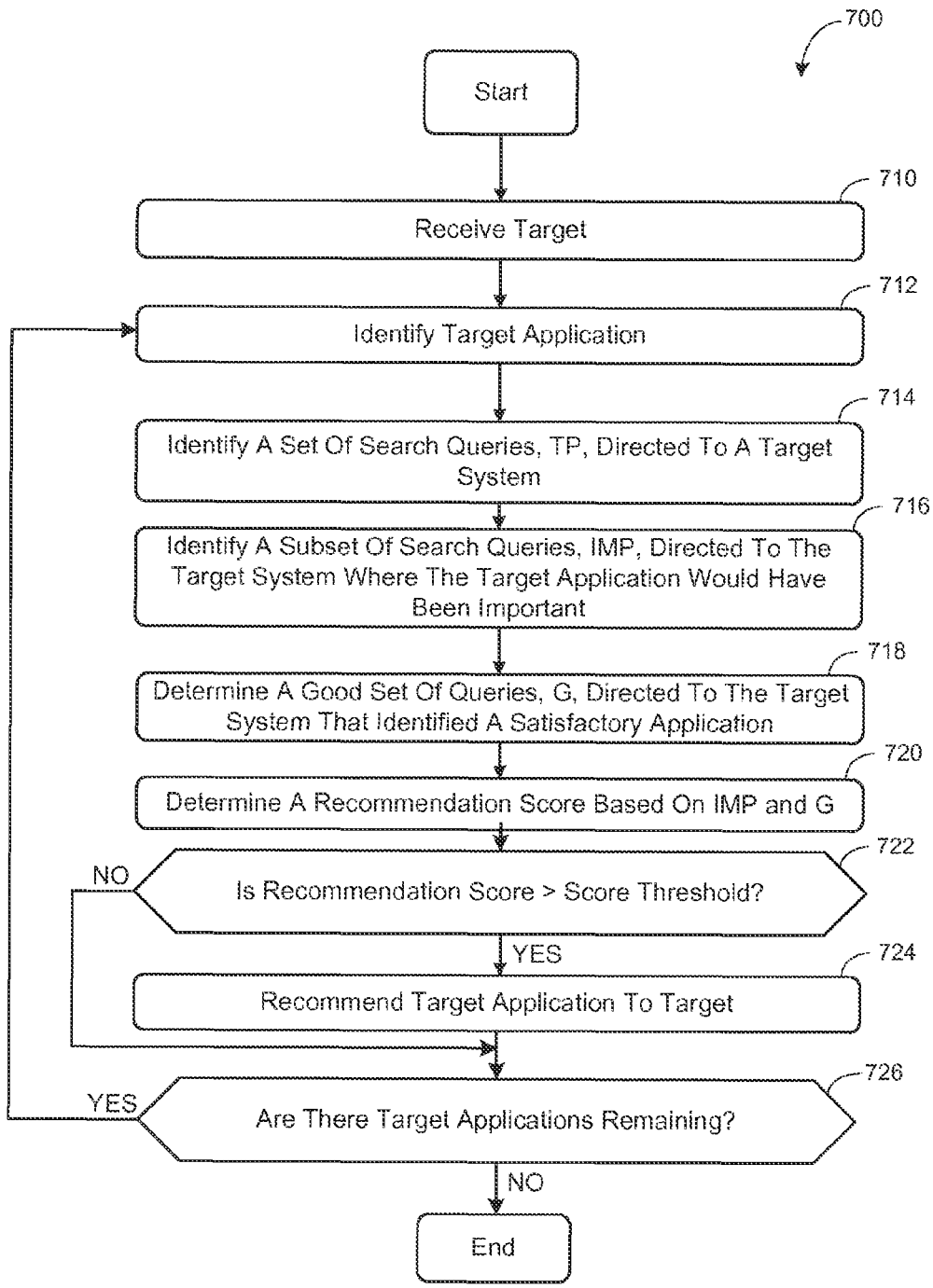
FIG. 7 is a flow chart illustrating an example set of operations of a method for recommending an application to a target.

FIG. 7 illustrates an example set of operations of a method 700 for determining whether to recommend one or more target applications 140 based on query log data. For purposes of explanation, the method 700 is described with respect to the recommendation engine 200b of FIG. 2B.

At operation 710, the identification module 252 receives a target, as was described with respect to operation 410 of FIG. 4. At operation 712, the identification module 252 determines a target application 140. The identification module 252 can identify a target application 140 in any suitable manner, as was described with respect to operation 412 of FIG. 4.

At operation 714, the recommendation module 254 determines a set of search queries 122 directed to the target system (TP). The recommendation module 254 can determine TP in the manner described with respect to operation 614 of FIG. 6. At operation 716, the recommendation module 254 determines a set of search queries 122 where the target application 140 would have been implicated by the search query 122 had the target application 140 been available on/for the target system (IMP). The recommendation module 254 can determine IMP in the manner described with respect to operation 616 of FIG. 6.

At operation 718, the recommendation module 254 identifies a set of search queries directed to the target system that resulted in a positive response (GP). As previously discussed a positive response can include user feedback where a user selects a displayed search result and/or downloads an application indicated by the search results 132. The recommendation module 254 can identify the set of search queries, GP, by analyzing the query records 360 that identify the search queries 122 defined in TP. For each of these query records 360, the recommendation module 254 can examine the query log data 366 of the query record 360 to determine whether positive user feedback was received in response to the search results 132 that were generated in response to a particular search query 122. If so, the search query 122 is included in GP. The foregoing indicates that the search results 132 included a high click-through rate (selection of a displayed search result and/or downloading of an application) despite the target application 140 not appearing in the search results 132. The foregoing suggests that there is an at least adequate substitute application that is being indicated in the search results 132 in response to the query 122.

At operation 720, the recommendation module 254 determines a recommendation score based on IMP and GP. In some implementations, the recommendation module 254 determines a set of search queries 122 where there was no adequate substitute application (IA) based on IMP and GP. In some implementations, the recommendation module 254 determines IA according to:

$$IA = |IMP| - |IMP \cap GP| \qquad (2)$$

In other words, the recommendation module 254 determines a set of search queries 122 that can be improved if the target application 140 was available on/for the target system. The recommendation module 254 can determine the recommendation score of the target application based on the contents of IA. For example, in some implementations the recommendation module 254 sets the recommendation score equal to the number of search queries 122 included in IA. In other implementations, the recommendation module 254 sets the recommendation score equal to the number of search queries 122 in IA divided by the number of search queries 122 identified in TP.

At operating 722, the recommendation module 254 determines whether the recommendation score exceeds a threshold. The value of the threshold may be manually programmed or may be learned by a machine learning algorithm. If the recommendation score exceeds a threshold, the recommendation module 254 recommends the target application 140 to the target, as shown at operation 724. In some implementations, the recommendation module 254 adds the application ID of the target application 140 to a set of recommended applications. In these implementations, the set of recommended applications can be used to generate a report that is provided to the target.

At operation 726, the recommendation module 254 determines whether there are any remaining target applications 140 to analyze. If so, the recommendation module 254 identifies a next target application, as show at operation 712. If not, the recommendation module 254 can output the set of recommended applications and/or store the set of recommended applications on the storage device 270.

The method 700 of FIG. 7 is provided for example. Variations of the method 700 are contemplated and are within the scope of the scope of the disclosure. For example, the identification module 252 can identify a target category (C). For the target category. C, the recommendation module 254 can identify a first set of search queries 122 $IMP_C$ and a second set of search queries 122 $GP_C$ in the manner described above but across an entire category. The recommendation module 254 can then determine $IC = |IMP_C| - |IMP_C \cap GP_C|$. In this way, the recommendation module 254 identifies queries 122 that would have implicated applications within the category had the category been adequately represented on/for the target system. The recommendation module 254 can then determine the recommendation score of the category C based on $IMP_C$.

FIG. 8 illustrates an example set of operations of a method 800 for identifying search queries 122 that do not have adequate search results 132. Put another way, the recommendation engine 200b can be configured to determine whether there is an unmet need in the marketplace by examining search queries 122 that have been provided to the search engine 200a. For purposes of explanation, the method 800 is described with respect to the components of the recommendation engine 200b of FIG. 2B.

At operation 810, the identification module 252 obtains a query record 360 from the query record datastore 350. At operation 812, the recommendation module 254 determines a query recommendation score of the search query 122 based on the coverage rate of the search query 122 defined in the query record 360. The coverage rate of a search query 122 can refer to an average amount of applications indicated in search results 132 provided in response to the search query 122. In some implementations, the recommendation module 254 determines the number of applications indicated in the search results 132 each time the search query 122 is processed, and then determines the coverage rate based on thereon. The query recommendation score can be set equal to the coverage rate or a function thereof. In some implementations, the recommendation module 254 only considers search queries 122 processed within a prescribed time period. For example, the recommendation module 254 can only consider search queries 122 processed within the previous three months. In this way, if a search query 122 was previously underrepresented but applications that are implicated by the search query 122 are subsequently developed, the search query 122 may no longer be considered underrepresented.

At operation 814, the recommendation module 254 determines whether the query recommendation score of the search query 122 is less than a threshold. The threshold can be set manually or can be learned using a machine learning algorithm. If the query recommendation score is less than a threshold, then the recommendation module 254 recommends the search query 122 to a target, as shown at operation 816. In some implementations, the recommendation module 254 can include the query ID of the search query 122 in a set of recommended search queries 122 when the query recommendation score is below the threshold. In some implementations, the recommended search queries 122 can be included in a report. In this way, the target may use this information to determine which types of applications that potential users are searching for but not finding.

At operation 818, the identification module 252 determines whether there are any remaining query records 360 to analyze. If so, the identification module 252 retrieves another query record 360, as shown at operation 810. Otherwise, the method 800 stops executing and the recommendation module 254 can output the set of recommended set of search queries 122 and/or store the set of recommended search queries 122.

The method 800 of FIG. 8 is provided for example. Variations of the method 800 are contemplated and are within the scope of the disclosure. For instance, the query recommendation score can be adjusted based on the frequency of the search query 122. For instance, frequently submitted search queries 122 may be more likely to be recommended than infrequently submitted queries 122. In this way, popular search queries 122 that do not have a high coverage rate are more likely to be recommended than less popular search queries 122.

FIG. 9 illustrates an example set of operations of a method 900 for identifying search queries 122 that do not have adequate search results 132. In these implementations, the recommendation engine 200b can be configured to determine whether there is an unmet need in the marketplace by examining search queries 122 when the search engine 200a does not have confidence in the search results 132 generated in response to the search query 122. For purposes of explanation, the method 900 is described with respect to the components of the recommendation engine 200b of FIG. 2B.

At operation 910, the identification module 252 obtains a query record 360 from the query record datastore 350. At operation 912, the recommendation module 254 determines a query recommendation score based on confidence values attributed to the search results 132 corresponding to the individual search results returned in response to the search query 122 defined in the query record 360. In some implementations, the confidence value of an individual search result is the result score of the application indicated in the individual search result. In some of these implementations, the recommendation module 254 can average the respective result scores of each search result identified in the query log data 366 of the retrieved query record 360. In other implementations, the recommendation module 254 averages the highest M result scores corresponding to a particular search. The recommendation module 254 can set the query recommendation score equal to the average result score or a function thereof. In some implementations, the recommendation module 254 only considers search queries 122 processed within a prescribed time period for purposes of determining the query recommendation score. For example, the recommendation module 254 can only consider search queries 122 processed within the previous three months. In this way, if a search query 122 was previously yielding search results with low result scores, but more recently applications have been developed that yield higher result scores, the search results 132 may no longer be considered inadequate.

At operation 914, the recommendation module 254 determines whether the query recommendation score of the search query 122 is less than a threshold. The threshold can be set manually or can be learned using a machine learning algorithm. If the query recommendation score is less than a threshold, then the recommendation module 254 recommends the search query 122 to a target, as shown at operation 916. In some implementations, the recommendation module 254 can include the query ID of the search query 122 in a set of recommended search queries 122 when the query recommendation score is below the threshold. In some implementations, the recommended search queries 122 can be included in a report. In this way, the target may use this information to determine which types of applications that potential users are searching for but not finding.

At operation 918, the identification module 252 determines whether there are any remaining query records 360 to analyze. If so, the identification module 252 retrieves another query record 360, as shown at operation 910. Otherwise, the method 800 stops executing and the recommendation module 254 can output the set of recommended set of search queries 122 and/or store the set of recommended search queries 122.

The method 900 of FIG. 9 is provided for example. Variations of the method 900 are contemplated and are within the scope of the disclosure. For instance, the recommendation module 254 can adjust the query recommendation score based on the frequency of the search query 122. For instance, frequently submitted search queries 122 may be more likely to be recommended than infrequently submitted queries 122. In this way, popular search queries 122 that do not have a high coverage rate are more likely to be recommended than less popular search queries 122.

FIG. 10 illustrates an example set of operations of a method 1000 for identifying search queries 122 that do not have adequate search results 132. In these implementations, the recommendation engine 200b can be configured to determine whether there is an unmet need in the marketplace by identifying search queries 122 that produced search results that users did not find relevant. In particular, the recommendation engine 200 determines whether the users positively or negatively responded to the search results 132, which can indicate the perceived relevance of the search results 132. For purposes of explanation, the method 900 is described with respect to the components of the recommendation engine 200b of FIG. 2B.

At operation 1010, the identification module 252 obtains a query record 360 from the query record datastore 350. At operation 1012, the recommendation module 254 determines a query recommendation score based on a relevance of the search results 132 with respect to the search query 122. In some implementations, the recommendation module infers relevance from the feedback received from users when presented with a set of search results 132, as defined in the query log data 366 of the query record 360. In particular, the query log data 366 defines whether users selected one or more of the displayed search results and/or downloaded the application. Thus, the recommendation module 254 can determine a click-through rate of the search results 132 provided in response to the search query 122. Put another way, the recommendation module 254 can determine how often users select a displayed search result and/or download an application indicated by a displayed search result in response to being presented displayed search results 132. In some implementations, the recommendation module 254 sets the query recommendation score equal to the click-through rate of the search query 122 or a function thereof. In some implementations, the recommendation module 254 only considers search queries 122 defined in the query record 360 processed within a prescribed time period for purposes of determining the query recommendation score. For example, the recommendation module 254 can only consider search queries 122 processed within the previous three months. In this way, if a search query 122 was previously yielding search results with low click-through rates, but more recently applications have been developed that yield higher click-through rates, the search results 132 may no longer be considered inadequate.

At operation 1014, the recommendation module 254 determines whether the query recommendation score of the search query 122 is less than a threshold. The threshold can be set manually or can be learned using a machine learning algorithm. If the query recommendation score is less than a threshold, then the recommendation module 254 recommends the search query 122 to a target, as shown at operation 1016. In some implementations, the recommendation module 254 can include the query ID of the search query 122 in a set of recommended search queries 122 when the query recommendation score is below the threshold. In some implementations, the recommended search queries 122 can be included in a report. In this way, the target may use this information to determine which types of applications that potential users are searching for but not finding.

At operation 1018, the identification module 252 determines whether there are any remaining query records 360 to analyze. If so, the identification module 252 retrieves another query record 360, as shown at operation 1010. Otherwise, the method 1000 stops executing and the recommendation module 254 can output the set of recommended set of search queries 122 and/or store the set of recommended search queries 122.

The method 1000 of FIG. 10 is provided for example. Variations of the method 1000 are contemplated and are within the scope of the disclosure. For instance, the recommendation module 254 can adjust the query recommendation score based on the frequency of the search query 122. For instance, frequently submitted search queries 122 may be more likely to be recommended than infrequently submitted queries 122. In this way, popular search queries 122 that do not have a high coverage rate are more likely to be recommended than less popular search queries 122.

FIG. 11 illustrates an example set of operations of a method 1100 for generating a report 152. The method 1100 can execute after the completion of any one of methods 400, 500, 600, and/or 700. For purposes of explanation, the method 1100 is explained with respect to the recommendation module 254 of FIG. 2B.

At operation 1110, the recommendation module 254 receives a set of recommended applications. The set of recommended applications can include application IDs 312 of applications that were unavailable on/for a target system and that unavailability was deemed significant based on statistics corresponding to the application or to the query log data 366 collected by a search engine 200a or partner device 120 (See e.g., FIGS. 4-7).

At operation 1112, the recommendation module 254 clusters application records 310 corresponding to the application IDs 312. The recommendation module 254 can retrieve the application records 310 corresponding to the application IDs 312 from the application datastore 300. The recommendation module 254 can then cluster the application records 310 based on features defined in the application records 310. In some implementations, the recommendation module 254 clusters the application records 310 with a set of categorized application records 310, whereby the set of categorized application records 310 have already been classified (e.g., a manually-curated application records). In this way, the retrieved application records 310 may be clustered into clusters having known categories. The recommendation module 254 can be configured to perform any suitable clustering technique, including but not limited to, k-means clustering, bi-clustering, SVD based clustering, collaborative filtering, co-clustering, etc.

At operation 1114, the recommendation module 254 determines a category of each application identified in the set of recommended applications. Upon clustering, the recommendation module 254 can assign a category to each application based on the category of the cluster to which the corresponding application record 310 was clustered.

At operation 1116, the recommendation module 254 generates a report 152 based on the categories assigned to the applications. In some implementations, the recommendation module 254 creates a new document and inserts each of the categories determined at operation 1114 into the document. Additionally, for each category, the recommendation module 254 can insert the application names of the applications and statistics used to identify the applications. At operation 1118, the recommendation module 254 stores or outputs the report 152. The recommendation module 254 can output the report to a screen or to an external device via a network.

FIG. 12 illustrates an example set of operations of a method 1200 for generating a report 152. The method 1200 can execute after the completion of any one of methods 800, 900, and/or 1000. For purposes of explanation, the method 1200 is explained with respect to the recommendation module 254 of FIG. 2B.

At operation 1210, the recommendation module 254 receives a set of recommended search queries 122. The set of recommended search queries 122 can include query IDs 362 of search queries 122 that did not produce adequate search results 132 based on query log data 366 collected by the search engine 200a or a partner device. 120 (See e.g., FIGS. 8-10).

At operation 1212, the recommendation module 254 performs entity recognition on each search query 122 indicated in the set of recommended search queries 122. The recommendation module 254 can retrieve the query records 360 corresponding to the query IDs 362 from the query record datastore 350. For each query record 360, the recommendation module 254 obtains the query terms of the search query 122 from the query record 360. For each search query 122, the recommendation module 254 performs entity recognition on the query terms of the search query 122. In some implementations, the recommendation module 254 utilizes an index of known entities. The index of known entities can associate known entity names to entity types. For example, an index entry for the entity "ANGRY BIRDS" (a popular puzzle game by Rovio, Inc.) may index to the entity types "games," "rovio," and "popular apps." Each set of query terms may index to zero or more entity types. Additionally or alternatively, the recommendation module 254 may utilize an external resource, such an on-line encyclopedia or knowledge base, to identify potential entity types. For example, the recommendation module 254 can reference the WIKIPEDIA on-line encyclopedia maintained by the Wikimedia Foundation to determine potential entity types. In this example, the recommendation module 254 can identify articles on the WIKIPEDIA encyclopedia using the query terms, and if an article is found, the recommendation module 254 can extract one or more entity types based on the contents of the article. The recommendation module 254 can determine the entity type(s) corresponding to each search query 122 identified at operation 1210 in any other suitable manner.

At operation 1214, the recommendation module 254 generates a query-to-entity-type matrix. The query-to-entity-type matrix may be a matrix having a first dimension (e.g., the rows) defining the search queries 122 determined at 1210 and a second dimension (e.g., the columns) defining all the possible entity types. In some implementations, the elements of the matrix are Boolean values, whereby when an element is set to true, the element represents that the search query 122 may map to the entity type, or entity-type category. The recommendation module 254 sets the values of the elements of the query-to-entity-type matrix according to the entity recognition performed at operation 1212. For instance, if a first search query 122 maps to the first and third entity types, then the recommendation module 254 can set the values of elements (1, 1) and (1, 3) equal to one.

At operation 1216, the recommendation module 254 determines underrepresented categories based on the contents of the query-to-entity-type matrix. In some implementations, the recommendation module 254 can calculate an entity type frequency distribution based on the matrix. For instance, for each entity type defined in the matrix (e.g., for each column of the matrix), the recommendation module 254 can sum the values of the elements corresponding to the entity type (e.g., the value of each element in the column) to obtain the frequency distribution of the entity type. If the frequency distribution of the entity type exceeds a threshold, the recommendation module 254 considers the entity type to be an underrepresented category.

At operation 1218, the recommendation module 254 generates a report 152 based on the underrepresented categories that the recommendation module 254 identified at operation 1216. In some implementations, the recommendation module 254 creates a new document and inserts each of the underrepresented categories determined at operation 1214 into the document. For example, the recommendation module 254 can insert a text string representing the name of the entity type in the document. Additionally, for each category, the recommendation module 254 can insert the search queries 122 that map to the entity type, the statistics used to identify the search queries 122, and/or the frequency distribution of the entity types (e.g., how many search queries 122 mapped to each underrepresented category). At operation 1220, the recommendation module 254 stores or outputs the report 152. The recommendation module 254 can output the report to a screen or to an external device via a network.

The methods of FIGS. 11 and 12 are provided for example only. Variations of the method exist and are within the scope of the disclosure.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, VR-display, 3D-interactive display or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for identifying gaps in search results generated in response to search queries sent to a search engine that identifies applications implicated by the search queries, the method comprising:
   maintaining, by a processing device, a query record datastore that stores a plurality of query records, each query record corresponding to a search query or a group of substantially similar search queries including the search query and indicating one or more sets of search results that the search engine provided to a requesting user device in response to the search query, each set of search results including one or more application identifiers respectively indicating one or more applications that were represented in the set of search results;
   identifying, by the processing device, a target query record from the query record datastore corresponding to a target search query;
   determining, by the processing device, a query recommendation score of the target search query based on the target query record;
   selecting, by the processing device, whether to recommend the target search query based on the query recommendation score; and
   when the target search query is selected for recommendation, recommending the target search query to a target organization,
   wherein recommending the target search query includes:
      including, by the processing device, a query identifier of the target search query in a set of recommended search queries;
      for each search query in the set of recommended search queries, performing, by the processing device, entity recognition on the search query to identify zero or more potential entity types associated with the search query;
      determining, by the processing device, a category corresponding to the target search query based on the entity recognition; and
      generating, by the processing device, a report that indicates the category of the target search query, and
   wherein determining the category based on the entity recognition includes:
      generating a matrix based on the entity recognition, the matrix having a first dimension indicating the search queries in the set of recommended search queries and a second dimension indicating possible entity types, wherein elements of the matrix indicate whether a particular search query implicates a particular entity type; and
      for each entity type in the matrix:
         determining whether to recommend the entity type based on a number of populated elements in the matrix; and
         identifying the entity type as a recommended category based on the determining whether to recommend the entity type.

2. The method of claim 1, wherein determining the query recommendation score includes:
   determining a coverage rate of the search query from the query record, the coverage rate indicating an average amount of applications indicated in search results provided by the search engine in response to the target search query; and determining the query recommendation score based on the coverage rate.

3. The method of claim 1, wherein:

each application indicated in each set of search results defined in the target query record includes a result score associated therewith, and the result score indicates a degree of confidence in a match of the application to the search query.

4. The method of claim 3, wherein determining the query recommendation score includes:

determining a confidence value associated with the search query based on the query record, the confidence value indicating an average result score of the applications indicated in the sets of search results stored in the query record; and determining the query recommendation score based on the confidence value.

5. The method of claim 3, wherein:

each set of search results stored in the target query record includes a feedback indicator, and the feedback indicator indicates whether a user selected one or more of the search results in response to being presented with the search results.

6. The method of claim 5, wherein determining the query recommendation score includes:

determining a click-through rate associated with the search query based on the feedback indicators stored in the target query record; and determining the query recommendation score based on the click-through rate.

7. A recommendation engine that identifies gaps in search results generated in response to search queries sent to a search engine that identifies applications implicated by the search queries, the recommendation engine comprising:

a storage device storing a query record datastore, the query record datastore storing a plurality of query records, each query record including query data and query log data, wherein the query data indicates instances where a search query was processed by the search engine and the query log data indicates one or more sets of search results provided in response to the search query by the search engine, each set of search results including application identifiers respectively indicating applications that were represented in the set of search results in response to the search query;

a processing device that executes computer executable instructions, the instructions, when executed by the processing device, causing the processing device to:

identify a target query record from the query record datastore corresponding to a target search query;

determine a target query recommendation score of the target search query based on the target query record;

determine whether the target query recommendation score is below a threshold; and when the target query recommendation score is below the threshold, recommend the target search query to a target organization, wherein recommending the target search query includes:

including a query identifier of the target search query in a set of recommended search queries;

for each search query in the set of recommended search queries, performing entity recognition on the search query to identify zero or more potential entity types associated with the search query;

determining a category corresponding to the target search query based on the entity recognition; and generating, by the processing device, a report that indicates the category of the target search query, and wherein determining the category based on the entity recognition includes:

generating a matrix based on the entity recognition, the matrix having a first dimension indicating the search queries in the set of recommended search queries and a second dimension indicating possible entity types, wherein elements of the matrix indicate whether a particular search query implicates a particular entity type; and for each entity type in the matrix:

determining whether to recommend the entity type based on a number of populated elements in the matrix; and identifying the entity type as a recommended category based on the determining whether to recommend the entity type.

8. The recommendation engine of claim 7, wherein determining the target query recommendation score includes:

determining a coverage rate of the search query from the query record, the coverage rate indicating an average amount of applications indicated in search results provided by the search engine in response to the target search query; and determining the target query recommendation score based on the coverage rate.

9. The recommendation engine of claim 8, wherein:

each application indicated in each set of search results defined in the target query record includes a result score associated therewith, and the result score indicates a degree of confidence in a match of the application to the search query.

10. The recommendation engine of claim 9, wherein determining the target query recommendation score includes:

determining a confidence value associated with the search query based on the query record, the confidence value indicating an average result score of the applications indicated in the sets of search results stored in the query record; and determining the target query recommendation score based on the confidence value.

11. The recommendation engine of claim 9, wherein:

each set of search results stored in the target query record includes a feedback indicator, and the feedback indicator indicates whether a user selected one or more of the search results in response to being presented with the search results.

12. The recommendation engine of claim 11, wherein determining the target query recommendation score includes:

determining a click-through rate associated with the search query based on the feedback indicators stored in the target query record; and determining the target query recommendation score based on the click-through rate.

* * * * *